US006710962B1

(12) United States Patent
Caverly et al.

(10) Patent No.: US 6,710,962 B1
(45) Date of Patent: Mar. 23, 2004

(54) AUTOMATED TAPE LIBRARY

(75) Inventors: Charles Caverly, Orange, CA (US); Mark Baert, Foothill Ranch, CA (US)

(73) Assignee: Quantum Corporation, San Jose, CA (US)

( * ) Notice: Subject to any disclaimer, the term of this patent is extended or adjusted under 35 U.S.C. 154(b) by 425 days.

(21) Appl. No.: 09/688,723

(22) Filed: Oct. 16, 2000

(51) Int. Cl.[7] .................... G11B 15/18; G11B 17/00; G11B 19/02
(52) U.S. Cl. ............................ 360/69; 360/71
(58) Field of Search .................. 360/69, 71, 78.03, 360/88, 91, 92, 93

(56) References Cited

U.S. PATENT DOCUMENTS

| | | | |
|---|---|---|---|
| 5,231,552 A | 7/1993 | Schneider et al. | |
| 5,236,296 A | 8/1993 | Ostwald | |
| 5,883,864 A | 3/1999 | Saliba | |
| 5,925,119 A | 7/1999 | Maroney | |
| 6,304,416 B1 * | 10/2001 | McAllister et al. | 360/132 |
| 6,421,196 B1 * | 7/2002 | Takayama et al. | 360/71 |
| 6,445,528 B1 * | 9/2002 | Kano | 360/69 |

* cited by examiner

Primary Examiner—David Hudspeth
Assistant Examiner—Jason Olson
(74) Attorney, Agent, or Firm—Michael Zarrabian

(57) ABSTRACT

A digital data storage unit having: a multiplicity of media storage slots for receiving a plurality of storage media units, each storage media unit including a storage medium and a memory device (MD) for storing data, the memory device including an interface for transferring data to and from the memory device; one or more media data transfer devices physically distributed within the digital data storage unit in relation to the storage media slots for transferring data to and from the storage medium in each storage media unit; a loader mechanism for selectively moving a storage media unit between a storage media slot and said media data transfer devices for transferring data to or from the storage medium in the storage media unit; at least one memory data transfer device (MDTD) including a memory device interface for transferring data to and from the memory device of one or more storage media units; and a controller within the digital data storage unit, configured for controlling the loader mechanism to move storage media units to said one or more media transfer devices for transferring data to and from the storage medium in each storage media unit. The memory data transfer device further includes a controller interface for transferring data to and from the controller, and the controller further includes an interface for transferring data to and from the memory data transfer device. The controller is further configured for transferring data to and from the memory device of one or more storage media units via the memory data transfer device.

39 Claims, 17 Drawing Sheets

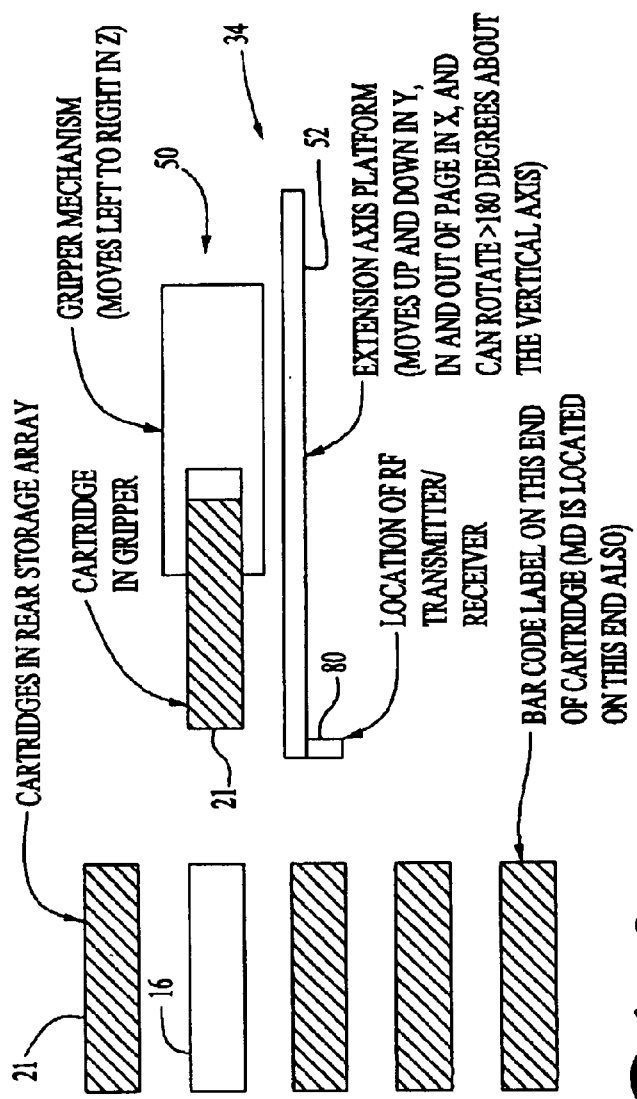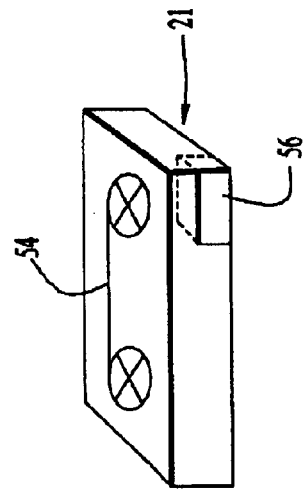

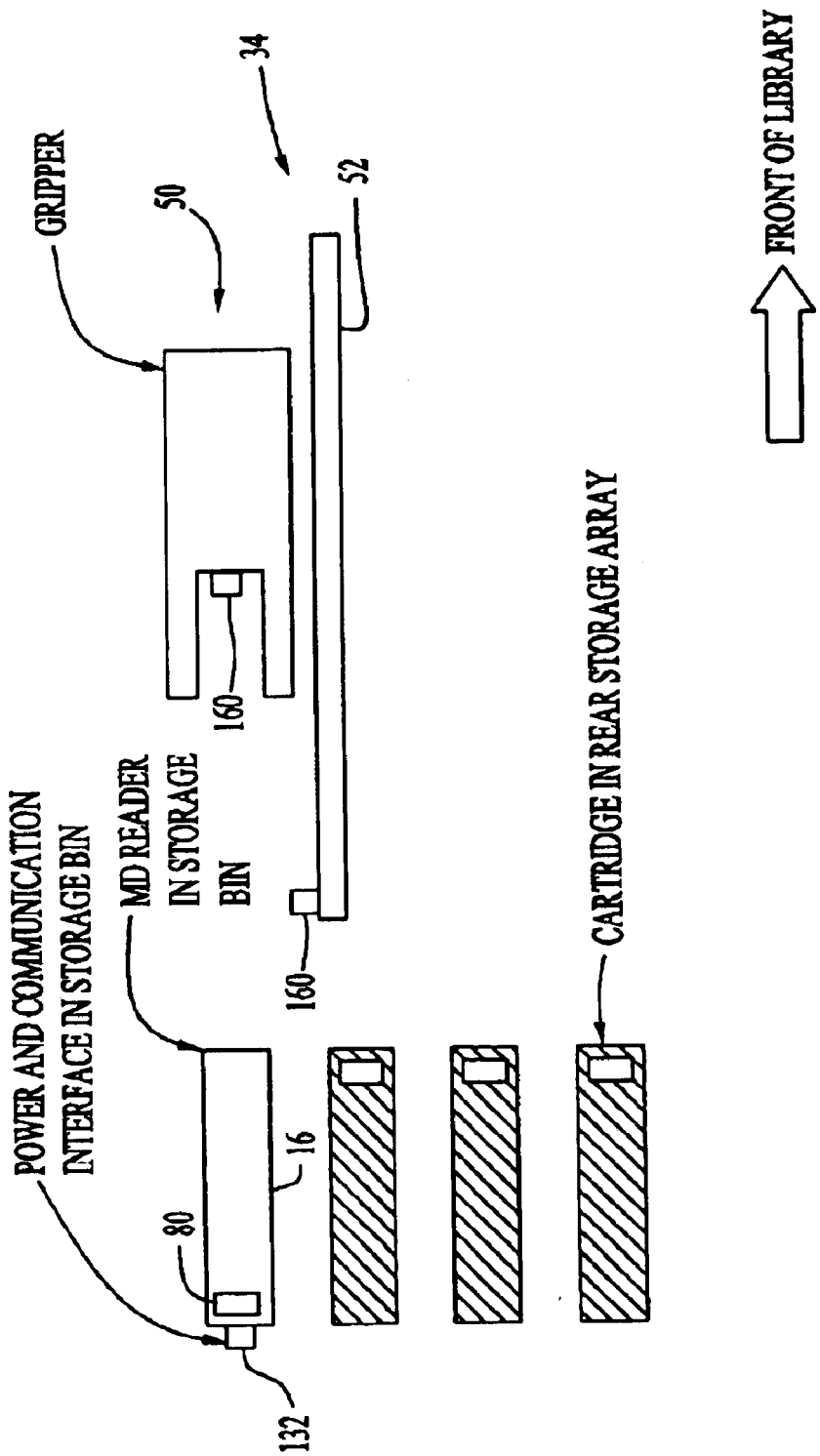

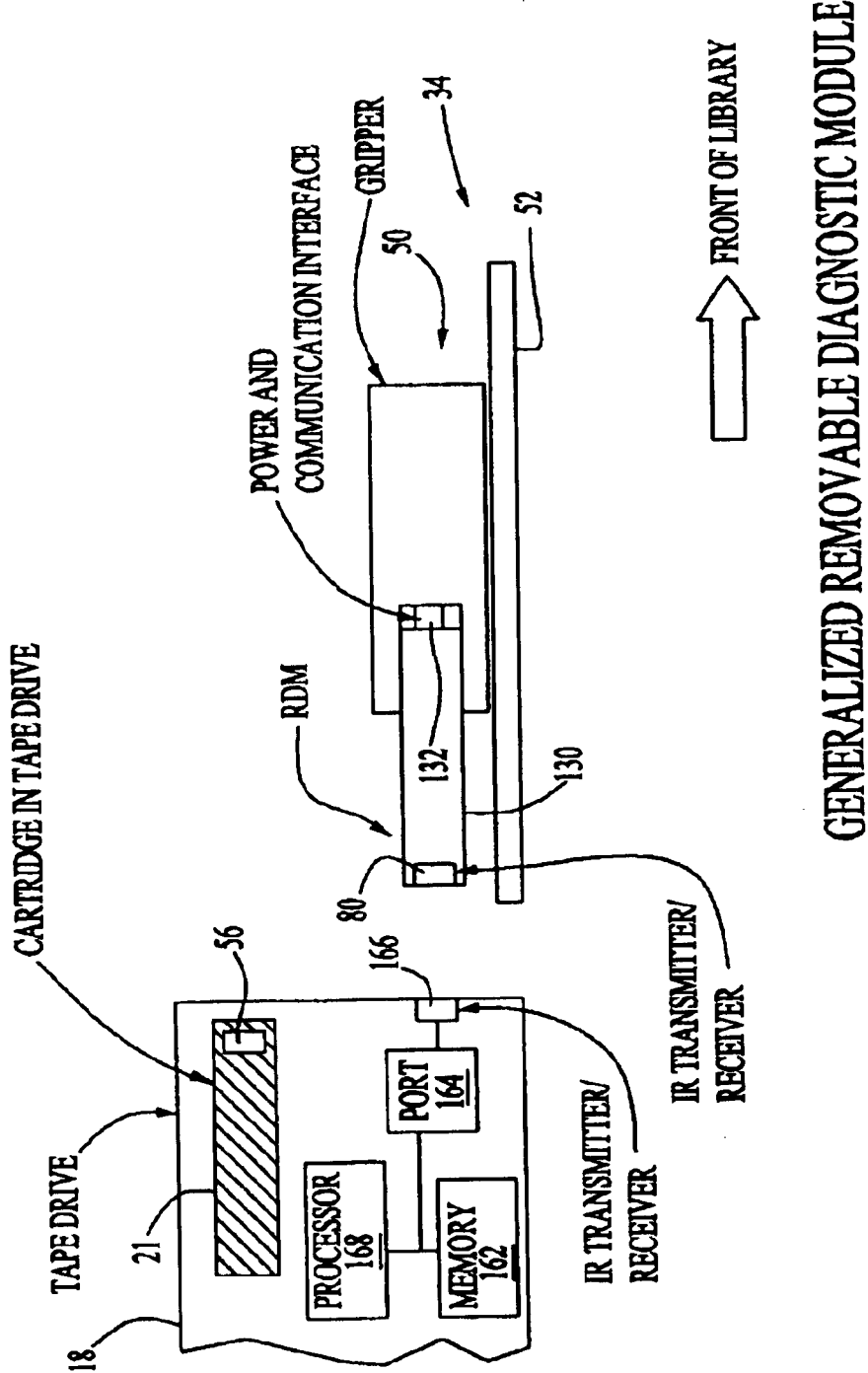

AUTOMATED TAPE LIBRARY

FIELD OF THE INVENTION

The present invention relates generally to an automated data storage library including media storage units, and more specifically to a communication interface for data transfer to and from each media storage unit.

BACKGROUND OF THE INVENTION

A typical data storage library such as a tape library includes an array of media storage unit (e.g., tape cartridge) storage slots, and one or more media drives (e.g., tape drives) for data transfer to and from the tape cartridges. A central cartridge inventory is maintained by a library controller, so that logical requests for a particular tape drive and cartridge may be translated by the library controller into physical tape cartridge and drive locations, and electromechanical operations.

Conventionally, in response to a host "move media cartridge to drive" command for transferring data to and from the tape cartridge, the tape cartridge must be picked and moved, to be loaded to a tape drive for reading or writing data to the tape cartridge. The data in the tape cartridge can include cartridge information such as directory information, file information, diagnostic information, cartridge history information, remaining life time of the cartridge, etc. related to each tape cartridge. The library includes a robotic arm that is elevated and rotated to a particular cartridge storage slot. A picker-gripper mechanism of the arm then "picks" and "grips" a tape cartridge stored in the slot and moves the tape cartridge out of the slot and into a temporary transport slot of the arm. The robotic arm is then commanded to perform a second rotation/elevation operation in order to present the retrieved tape cartridge to a loading tray of the selected tape drive, and the tape drive then loads the tape cartridge and threads the tape in the cartridge for recording/playback operations, following initial setup and calibration routines conventional with tape drives.

A disadvantage of the conventional libraries for data transfer to/from a tape cartridge is the time delay incurred between receiving the tape cartridge request and having the cartridge ready for user data operations at the selected tape drive. Further, frequent picking of cartridges and loading them into tape drives for transferring data, such as said cartridge information, is time consuming and can lead to premature wear of the cartridges, the robot, the tape drives, and other components of the library. Another disadvantage of such conventional libraries is that diagnostic operations on the tape drives are manually performed by a technician who examines each tape drive, thereby increasing maintenance cost and duration.

There is, therefore, a need for a data storage library wherein selected information can be transferred to and from each cartridge without loading the cartridge into a tape drive. There is also, a need for such a library to include a communication interface for transferring data to each cartridge without loading the cartridge into a tape drive. There is also, a need for such a library to allow efficient and preferably automated diagnostics operations on the tape drives therein.

BRIEF SUMMARY OF THE INVENTION

In one embodiment the present invention provides a method and digital data storage unit operating according to said method, that satisfy these needs. In one version, the digital data storage unit (data storage library) comprises: (a) a multiplicity of media storage slots for receiving a plurality of storage media units, each storage media unit including a storage medium and a memory device (MD) for storing data, the memory device including an interface for transferring data to and from the memory device; (b) one or more media data transfer devices physically distributed within the digital data storage unit in relation to the storage media slots for transferring data to and from the storage medium in each storage media unit; (c) a loader mechanism for selectively moving a storage media unit between a storage media slot and said media data transfer devices for transferring data to or from the storage medium in the storage media unit; (d) at least one memory data transfer device (MDTD) including a memory device interface for transferring data to and from the memory device of one or more storage media units; and (e) a controller within the digital data storage unit, configured for controlling the loader mechanism to move storage media units to said one or more media transfer devices for transferring data to and from the storage medium in each storage media unit.

The memory data transfer device further includes a controller interface for transferring data to and from the controller, and the controller further includes an interface for transferring data to and from the memory data transfer device. The controller is further configured for transferring data to and from the memory device of one or more storage media units via the memory data transfer device. In one version, the digital data storage unit further comprises a communication link for connecting the controller to an external system, wherein the controller is further configured for transferring data between the memory device of one or more storage media units and the external system using the memory data transfer device.

The digital data storage unit can further comprise a communication link connecting the controller to a host computer, wherein the controller is further configured for: (i) receiving and decoding a command sent by the host for access to a selected storage media unit to transfer data between the host computer and the memory device of the selected storage media, and (ii) transferring data between the host computer and the memory device of the selected storage media using the memory data transfer device.

In one version, the memory data transfer device can be supported by the loader mechanism, and the controller is further configured for controlling the loader mechanism for moving the memory data transfer device to a selected storage media unit in a storage media slot for transferring data between the memory data transfer device and the memory device in the storage media unit.

In another version of the digital data storage unit, the loader mechanism includes a gripper for gripping the memory data transfer device; the memory data transfer device is removably stored in the digital data storage unit; and the controller is further configured for controlling the loader mechanism for gripping and moving the memory data transfer device to a selected storage media unit for transferring data between the memory data transfer device and the memory device in the selected storage media unit.

Yet in another version of the digital data storage unit, the memory data transfer device is located in a storage location in the digital data storage unit; and the controller is further configured for controlling the loader mechanism to move one or more storage media units to said storage location for transferring data between the memory data transfer device and the memory device of each storage media unit.

In one example, such a digital data storage unit can comprise a tape library, wherein each storage media unit comprises a tape cartridge, and the storage media in the tape cartridge comprises magnetic tape; and each media data transfer device comprises a tape drive. According to the present invention, selected information can be transferred to and from each cartridge without loading the cartridge into a tape drive. The library includes a communication interface for transferring data to each cartridge without loading the cartridge into a tape drive. The library further allows efficient and preferably automated diagnostics operations on the tape drives therein.

BRIEF DESCRIPTION OF THE DRAWINGS

These and other features, aspects and advantages of the present invention will become better understood with regard to the following description, appended claims and accompanying drawings wherein:

FIG. 2A shows a simplified partial side view of an example picker mechanism used in the library of FIG. 1, wherein the data transfer device is mounted on the picker mechanism;

FIG. 2B shows a perspective view of an example tape cartridge including a memory device according to an aspect of the present invention;

FIG. 13 shows an example simplified partial side view of another embodiment of gripper mechanism the library of FIG. 1 including a bar code reader; and FIG. 14 shows an example simplified partial side view of another embodiment of the memory data transfer device of the library of FIG. 1 configured to communicate with one or more tape drives in the library.

Like reference numbers and designations in the drawings refer to like elements.

DETAILED DESCRIPTION OF THE INVENTION

Figure 1:
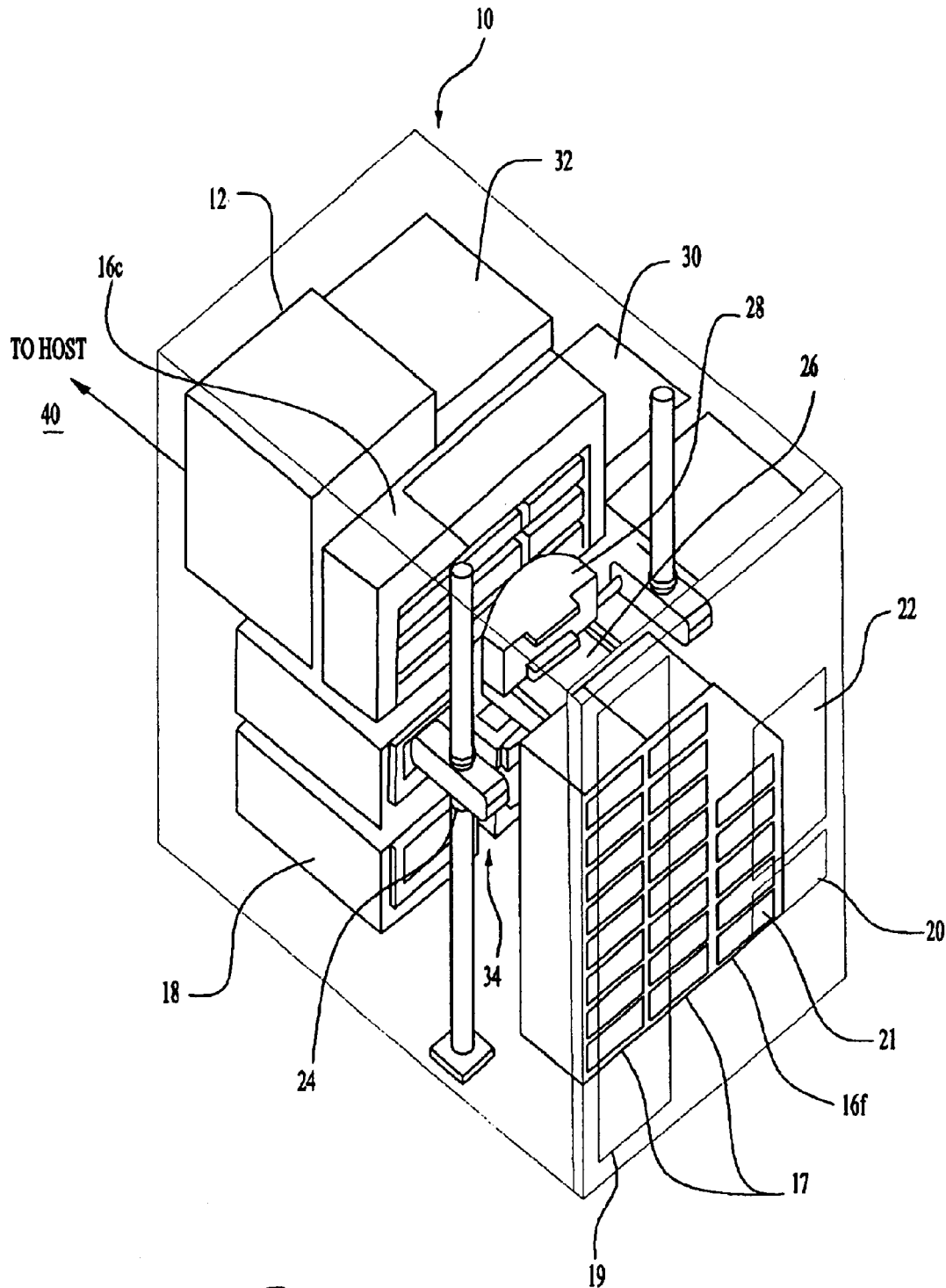
FIG. 1 is a simplified overview of an automated storage library including a memory data transfer device according to the present invention.

FIG. 1 shows a simplified overview of an example automated storage library 10 in which the present invention can be implemented. The library 10 includes a set of storage bins 16 (16r and 16f, rear and front positions, relative to the overall library, respectively) for housing a collection of data storage media 21 (e.g., tape cartridges) that may have data written to or read from them by media data transfer devices such as one or more tape drives 18 (e.g., DLT (TM) tape drive, distributed by Quantum (TM) Corporation). An exemplary data storage medium 21 can comprise a DLT (TM) tape cartridge for data communication with DLT (TM) drive 18. It should be clear to those skilled in the art that any type of removable data storage media and any type of media data transfer devices (e.g., tape drives), useful for such a media may be used in library 10 without deviating from the spirit or scope of this invention. An example automated storage library 10 is described in the commonly assigned U.S. Pat. No. 5,925,119, Maroney, Jul. 20, 1999, the description which is incorporated herein by reference. Another example automated storage library is described in the commonly assigned U.S. Pat. No. 5,883,864, Saliba, Mar. 16, 1999, the description which is incorporated herein by reference.

The library 10 also can include removable load packs 17, insertable through access port 19. The library 10 further includes a load port 20 for inserting and removing a data storage medium. A control panel 22 is useful for allowing the operator of the library to recognize the status of library operation, user control of the library, displaying a graphical user interface, etc. The library 10 further includes a loader mechanism such as a picker mechanism 34, which includes a vertical carriage 24 (Y-axis platform), a horizontal rotational extension platform 26, and a gripper mechanism 28 for grasping and transferring a data storage medium between one of the storage bins and the media data transfer device 18. A viewing window 30 is useful for an operator to view operation of the picker 34 to verify its operation and for trouble-shooting.

The library 10 further includes an electronics assembly (control)12 for communicating with a host computer 40 that resides outside of the library 10, and for controlling operation of the library 10, including operation of the picker 34. The electronics assembly 12 includes various electronic devices described further below. The electronics assembly 12 and various motors for operation of the movable components in the library 10 are powered by a power supply 32. The power supply 32 can be, for example, a 300 watt power supply of the type useful within a normal PC. The host computer 40 may be any type of computer system that may need to access data or have data stored in the library 10. For example, the host computer can comprise a Sun Microsystems™ Sparc Server™.

The example library 10 shown in FIG. 1 is a small library; however, this invention is useful with a library of any size having more or fewer data storage media (e.g., tape cartridges) and more or fewer media data transfer devices (e.g., tape drives). For example, the invention can be implemented in a P3000 library made by QuantumiATL™ having a central body and two doors. The P3000 library includes DLT drives and cartridges, or SDLT and LTO drives and cartridges, as well as DLT. That library includes 170 cartridges and up to 16 tape drives can be stored in a rear storage array. Further, another 156 cartridges and a 12-cartridge capacity load port can be accommodated in its two doors. This invention is also useful within a library that communicates with any type of host computer, including a mainframe or personal computer.

FIG. 2A shows a very simplified side view of an embodiment of the example picker mechanism 34 used in the library 10. The picker mechanism 34 comprises a gripper assembly 50 and an extension axis platform 52, wherein the gripper assembly 50 moves relative to the extension axis platform 52. In one version, the extension axis platform 52 moves in X-Y direction, where X is left to right as viewed from the front of the library 10, and Y is vertical. Additionally, the picker mechanism 34 can include the capability to rotate at least 180 degrees about the vertical axis, wherein the extension axis platform 52 rotates in yaw.

Referring to FIG. 2B, each of a set of tape cartridges 21 in the library 10 include a storage medium such as tape 54 for storing data, and a memory device (MD) 56. The MD 56 can be selectively placed in or on the tape cartridge 21. The tape 54 is for storing various data, and the MD 56 is for storing particular information.

Figure 2C:
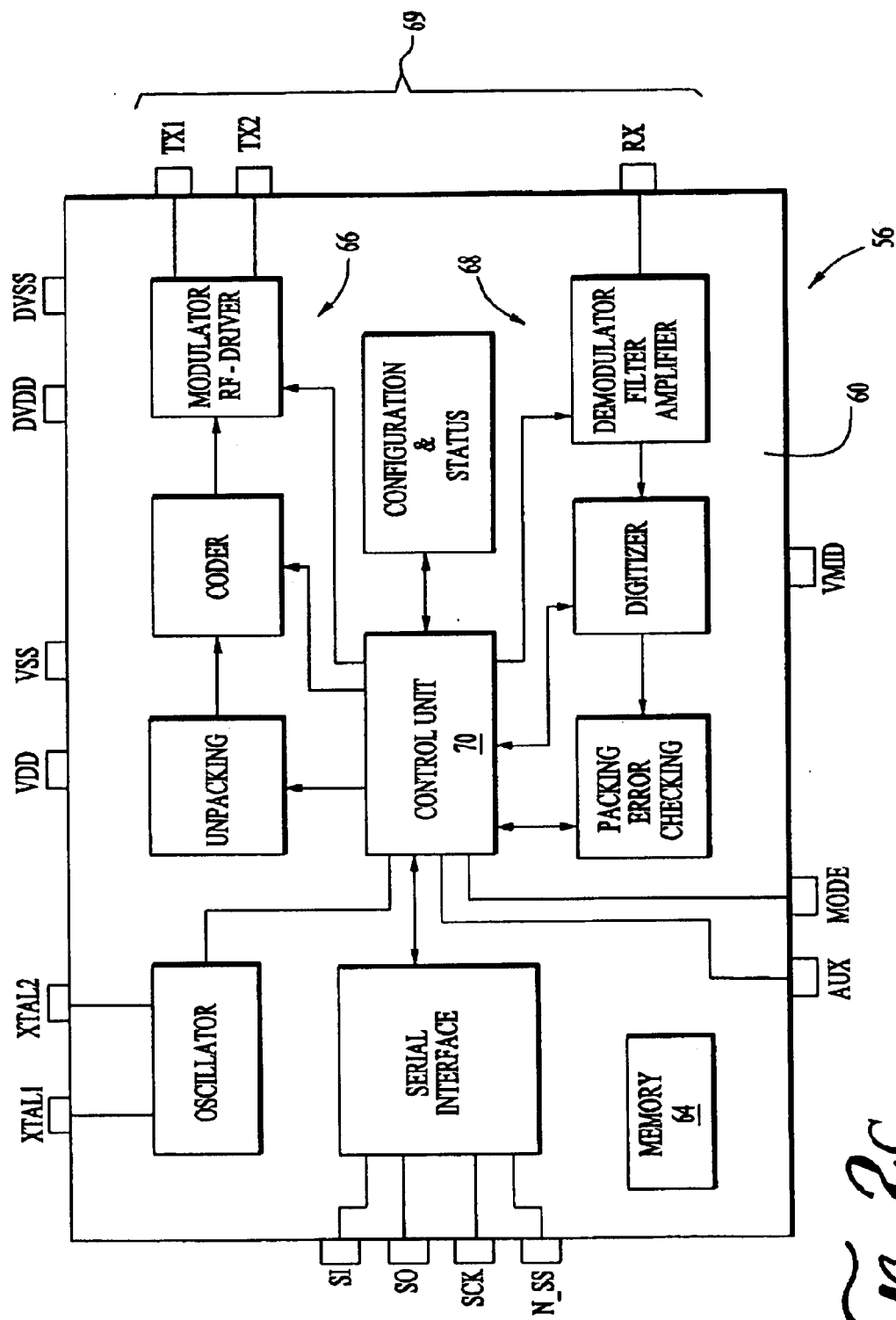
FIG. 2C shows an example block diagram of en embodiment of the memory device of FIG. 2B.

Referring to FIGS. 2C and 3, in one embodiment, the MD 56 can comprise e.g. an Integrated Circuit (IC) mounted on a printed circuit board 60 that is then mounted on or inside the tape cartridge 21. An example MD 56 IC is made by Phillips Semiconductors™, part no. LT1ICC1001. The MD 56 includes an antenna 62 (e.g., etched on the printed circuit board 60), wherein the antenna 62 provides interface with the MD 56 within the tape cartridge 21 via e.g. radio frequency (RF) transmission. The MD 56 further comprises e.g., memory 64 such as RAM and/or ROM for storing data and instructions, communication interface 69 (e.g., transceivers) such as RF transmitters 66 and receivers 68, and a control unit 70 (e.g., processor) for controlling data transfer and storage on the MD 56. Other means of communication in the MD 56 are possible, including e.g. infared (IR) communication, serial interface, etc. The MD 56 can include e.g. a power source, or alternatively electrical power for the MD 56 can be obtained e.g. from the RF signal used to interrogate the MD 56.

Data is transferred to and from the MD 56 via the RF transceivers 69, wherein the data stored in an MD 56 of a cartridge 21 is in addition to the data stored on the tape media 54 in that cartridge 21 (some of the information can be the same). The MD 56 can store various amounts of data depending on the size of the memory 64 therein. In one example, the MD 56 can store 16 Kbytes of data therein.

Data stored in the MD 56 can include e.g. cartridge information such as directory information, file information and location. Other types of data that can also be stored in the MD 56 include data that can be used for diagnostics so that appropriate preventive measures can be taken at system level. Examples of such data include: indication of how many times a corresponding tape cartridge 21 has been used; the amount of time that data has been resident on the cartridge 21; or, in the case of cleaning cartridges, how many cleaning cycles remain on the cartridge 21, etc. Data can be quickly transferred to and from the MD 56 according to the present invention. Conventional methods of writing such data onto the tape media 54 within a tape cartridge 21 require picking the cartridge 21, loading it into a tape drive 18, and then transferring data to from the tape media 54 in the cartridge 21.

To transfer data to and from one or more MDs 56, the library 10 includes at least one memory data transfer device (MDTD) 80 for transferring data to and from the MD 56 in each cartridge 21. An example advantage of using the MDTD 80 in conjunction with the MD 56 in each cartridge 21, is decreasing the initialization time for a backup software package to become aware of the contents of the cartridges 21 in the library 10 based on the information in the MD 56 for the cartridge 21. The information in the MD 56 can be read into the library electronics 12 via the MDTD 80, and communicated external to the library 10 without taking the time to load and unload every single cartridge 21 from a tape drive 18. The information in the MD 56 can be communicated back to an independent Software Vendors (ISVs) backup software package through the library SCSI interface, saving considerable initialization time. The SCSI (small computer system interface) standard is described in ANSI X3.131-1994.

Figure 3A:
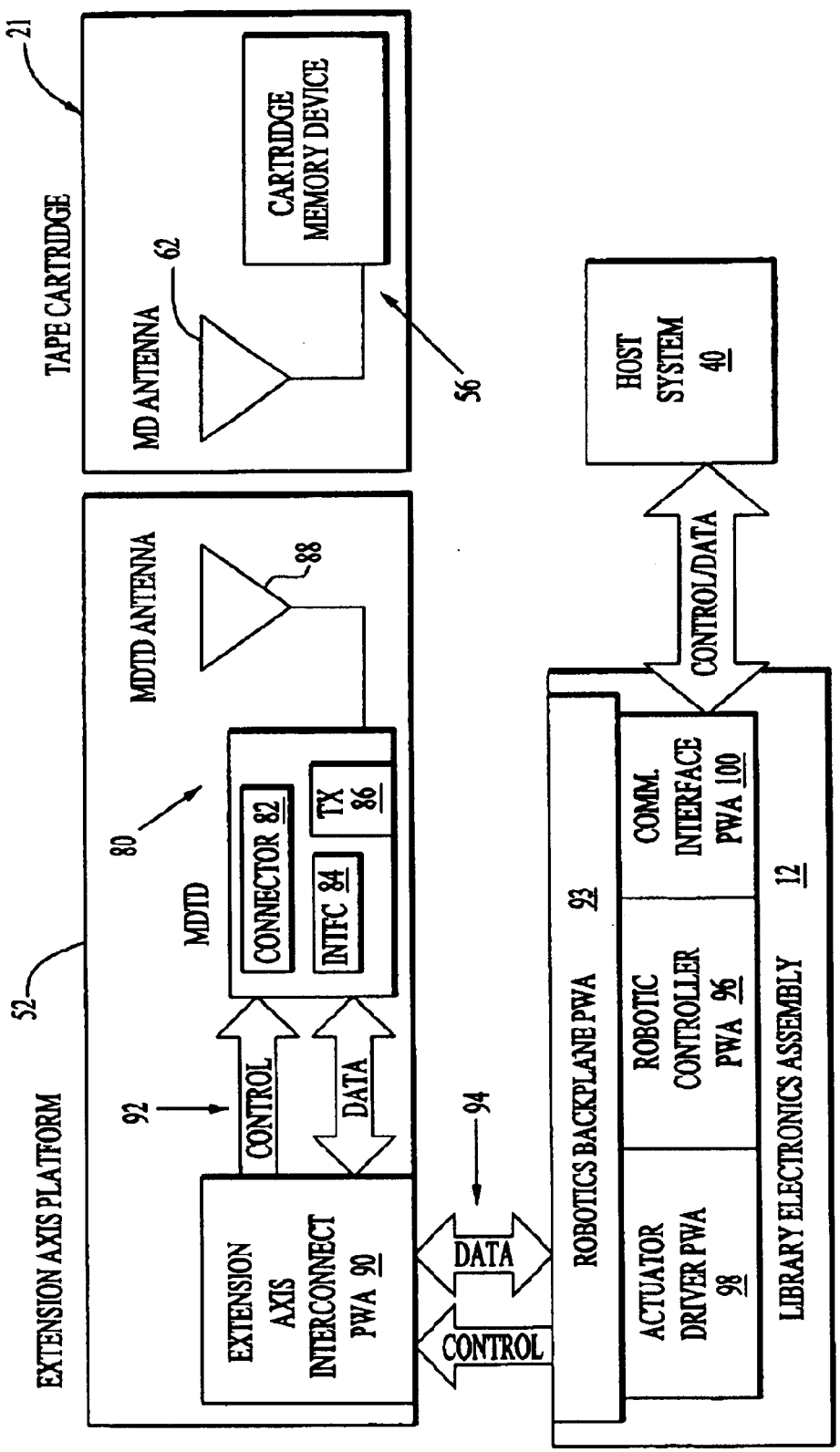
FIG. 3A shows an example block diagram of an embodiment of the system architecture of the library of FIG. 2.
Figure 3B:
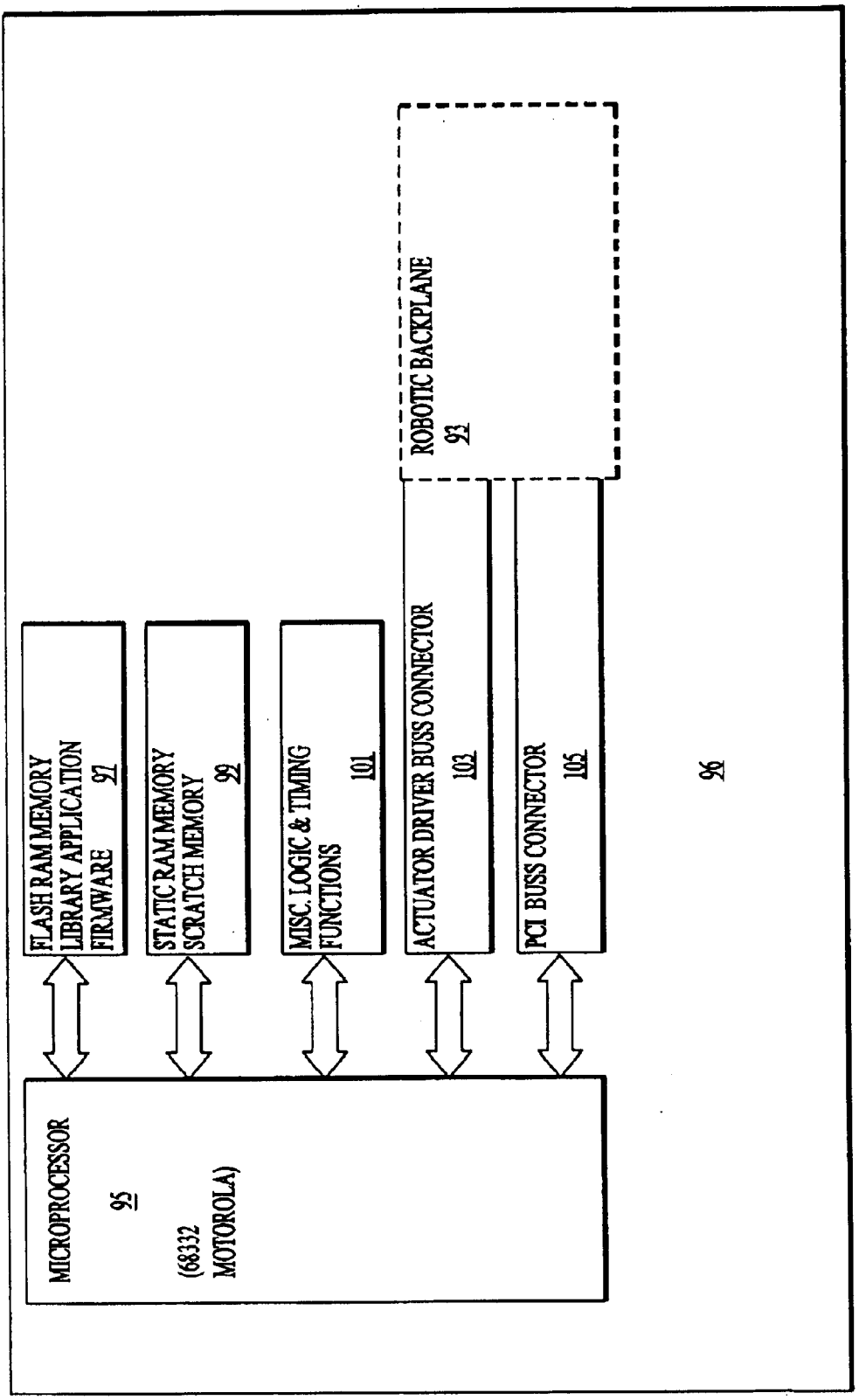
FIG. 3B shows an example block diagram of an embodiment of the robotic controller of FIG. 3A.

Referring back to FIG. 2A, in one embodiment of the library 10, the MDTD 80 is mounted on the extension axis platform 52 of the picker mechanism 34. Further, as shown in FIG. 3A, the MDTD 80 comprises a communication and power interface connector 82, interface electronics (Inffc.) 84, transceiver (TX) 86 and antenna 88 for communication with the MD 56 of each cartridge 21, when the extension axis platform 52 is placed proximate a cartridge 21 by the elevator/robot mechanism. An extension axis interconnect PWA 90 includes cabling and electronics to power, and transfer data to and from, the MDTD 80 via data and control lines 92 on the picker mechanism 34, through e.g. umbilical cables 94, and back to a robotic controller electronics PWA 96 in the library electronics assembly 12 at e.g. the rear of the library 10. As used herein, data can include both information and control. In one embodiment, the extension axis interconnect PWA 90 comprises an electronics circuit including passive components, and functions to provide a transition for signals (e.g., power and control) to/from the robotic picker mechanism 34 for the MDTD 80. As shown in FIG. 3B, in one embodiment the robotic controller electronics PWA 96 comprises a microprocessor 95, memory such as Flash RAM 97 and static RAM 99, logic and timing electronics 101, actuator driver bus connector 103 and PCI bus connector 105 connected to a robotic back plane 93, and the controller 96 is configured by firmware to operate the library 10 as described herein.

The library electronics assembly 12 further includes a robot/elevator actuator driver PWA 98 and a communication interface PWA 100 for data communication with a host system 40. The actuator driver PWA board(s) 98 convert control signals from the robotic controller 96 into voltage and current outputs used to control the motor/actuators in the library 10. The actuator driver boards 98 also receive feedback signals from the library actuators and convert them into digital information for the robotics controller 96 to use to close the actuator control loop. The communication interface PWA board 100 provides a communications interface to systems (e.g., host 40) external to the library 10. Industry standard communications interfaces such as SCSI-2, or Fiber Channel are supported by standard off-the-shelf boards that can be plugged into the library electronics. The communications interface PWA 100 allows the host system 40 to control, and transfer data to/from, the library 10 by issuing e.g. commands to move media to/from storage/drive locations. Information about the library's inventory, configuration and status are also communicated to the host system 40 via the communications interface PWA 100.

Generally, both the library 10 and the host computer 40 can each keep a database for the tape cartridge 21 inventory of the library 10. The library control 12 is aware of the location of different tape cartridges 21, and when the library 10 is first initialized, the library control 12 performs an operation to inventory the contents of the library 10. The tape cartridges 21 can have a barcode label identifying each tape cartridge 21 that the library control 12 reads using a bar code reader. The library control 12 keeps track of tape identification information along with the tape location in an inventory database in the library 10. When the host computer 40 first initializes, the host computer 40 inquires for the library inventory information from the library control 12. The host computer system 40 then keeps track of the library inventory and will only re-synchronize if there is some other external interaction in the library 10 that alters the inventory. Interactions such as opening the door of the library 10 or operating the library's loadport imply that an operator may be adding or removing tape cartridges 21 to the library 10. When such events occur the library control 12 performs another inventory operation, updates the inventor database in the library 10 and notifies the host computer 40 that an inventory altering event has occurred. The Host computer 40 then can request the updated inventory data from the library 10. Another inventory database maintained by the host system 40 includes information not only about the location of tape cartridges 21 within the library 10 but also information about the file locations contained on the tape cartridges 21. The inventory database of the library 10 only contains information on the location of tape cartridges within the library 10.

When the host computer 40 that commands the library 10 requires to read/write data to/from a tape cartridge 21, the host computer 40 sends e.g. a "Move Media" command to the control 12 of the library 10 to pick a specified tape cartridge 21 and move it to a specified tape drive 18. Once the "Move Media" command is complete, the host computer 40 is then able to directly access the information on the tape 54 in the cartridge 21. When the host computer 40 has completed reading/writing data to/from the tape 54, the host computer 40 sends another "Move Media" command to the control 12 of the library 10 to move the tape cartridge 21 from the tape drive 18 to a storage location 16. At this time both the library control 12 and the host computer 40 update their inventory database information.

Figure 4:
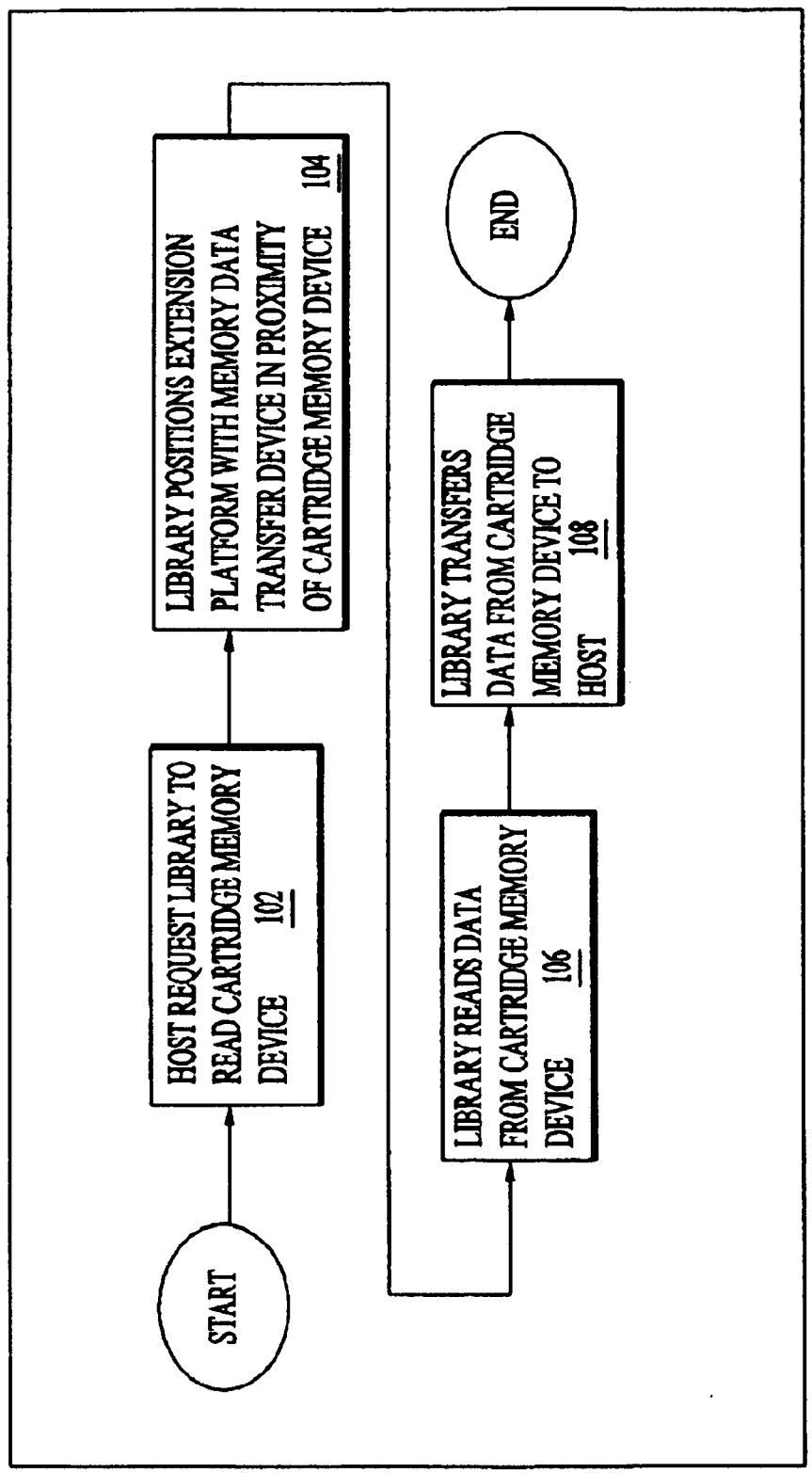
FIG. 4 shows an example flow diagram of the steps of transferring data to and from a cartridge in the system of FIG. 3A.

Referring to FIG. 4 in conjunction with FIGS. 3A–B, an example operation scenario for transferring data to/from an MD 56 of a cartridge 21 includes the steps of: The host 40 requests the library 10 to transfer data to or from (e.g., read) the MD 56 of a selected tape cartridge 21 (step 102). The library robot/picker/elevator 34 as controlled by the picker electronics (including the robotic controller 96) positions the extension platform 52 including the MDTD 80 in proximity of the MD 56 of the cartridge 21 (step 104). The library control 12 reads data from the MD 56 via the MDTD 80 (step 106), and transfers data from the MD 56 to the host system 40 (step 108).

Figure 5:
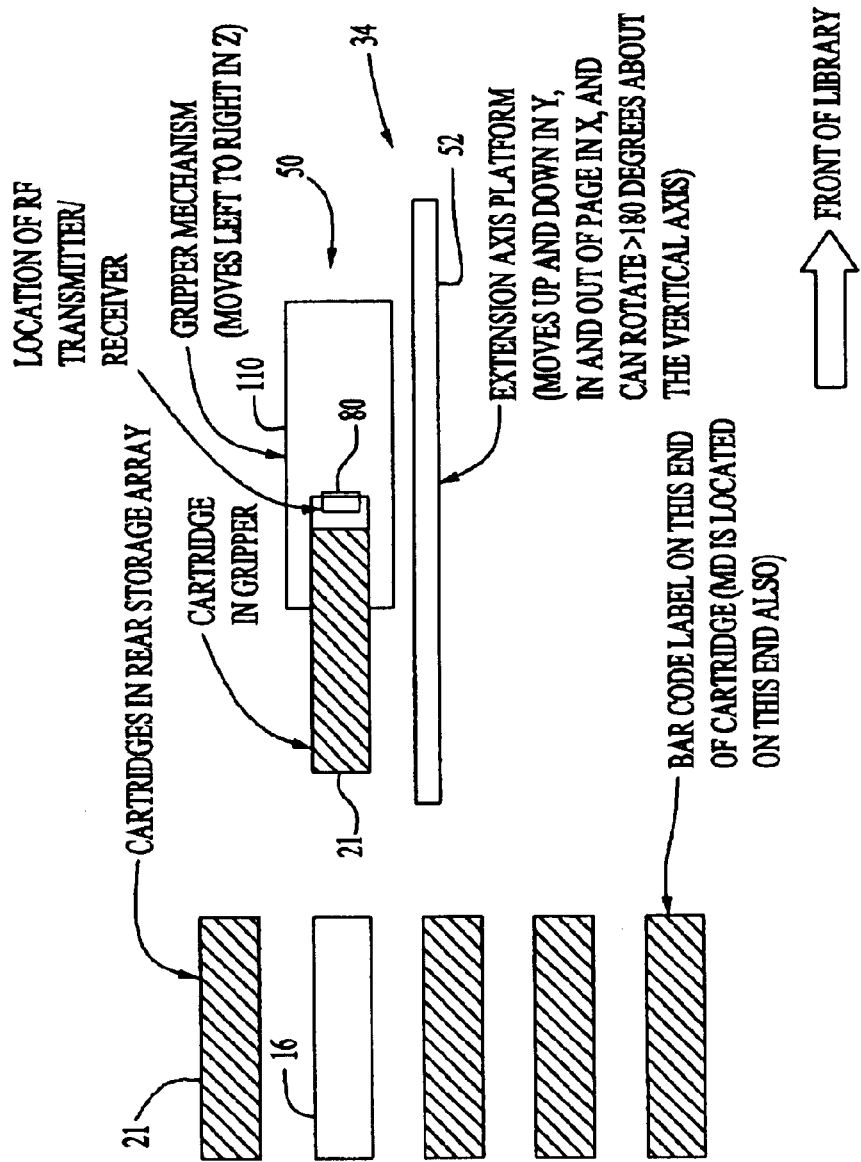
FIG. 5 shows a simplified partial side view of another example picker mechanism used in the library of FIG. 1, wherein the data transfer device is mounted in the jaws of the picker mechanism.
Figure 6:
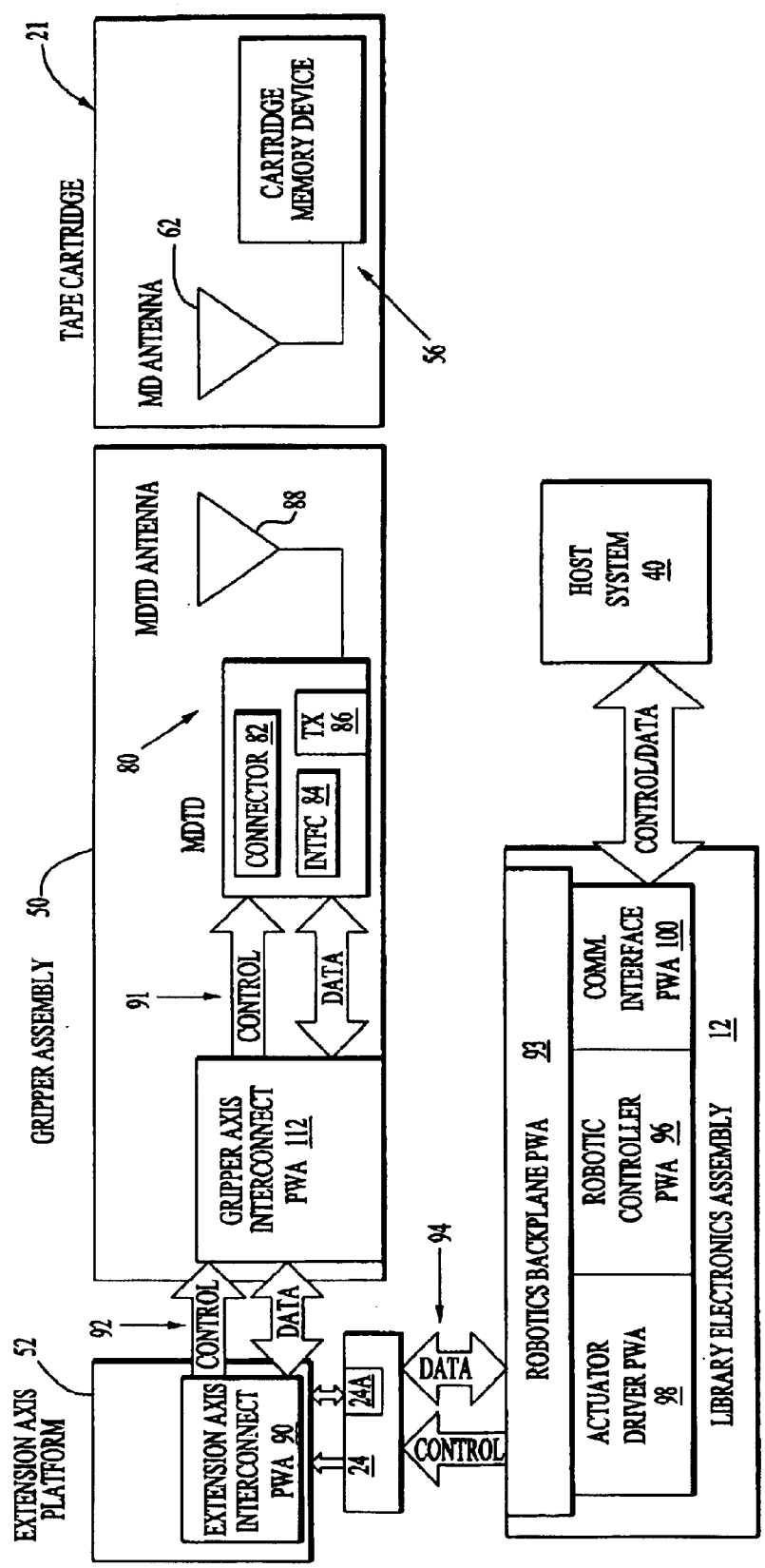
FIG. 6 shows an example block diagram of an embodiment of the system architecture of the library of FIG. 5.

Referring to FIG. 5, in another embodiment of the library 10, the MDTD 80 is mounted on the gripper 50 such as e.g. throat of the gripper jaws 110. To transfer data to and from the MD 56 in a selected cartridge 21, the library control 12 opens the gripper jaws 110, moves/translates the gripper 50 so that the jaws 110 are over and under the selected cartridge 21, closes the jaws 110 and holds the cartridge 21 to transfer data to and from the MD 56 of the cartridge 21 the MDTD 80 in the gripper 50. As shown in FIG. 6, the MDTD device 80 comprises a connector 82, interface electronics (Intfc.) 84, transceiver (TX) 86 and antenna 88 for communication with the MD 56 of each cartridge 21, when the cartridge 21 is in the gripper jaws 100 such that the MD 56 is proximate the MDTD 80.

In this embodiment, the gripper assembly 50 further includes a gripper axis interconnect PWA 112 comprising cabling 91 and electronics to power, and transfer data to/from, the MDTD 80, and back to the extension axis interconnect PWA 90 through lines 92, and via umbilical cables 94 to the robotic controller electronics PWA 96 in the library electronics assembly 12 at e.g. the rear of the library 10 as described above.

In one embodiment, the gripper axis Interconnect PWA 112 provides a transition for signals, both power and control to/from the MDTD 80 mounted on robotic gripper 50. In addition to the interface to the MDTD 80, the gripper axis interconnect PWA 112 includes connections for a motor that opens and closes the gripper jaws 110, a sensor that indicates the open/closed state of the gripper jaws 110, sensors that detect when a tape cartridge 21 is within the gripper's jaws 110, and a connector for an optional barcode scanner that can be mounted on the backside of the gripper mechanism 50 or the picker 34.

Figure 7:
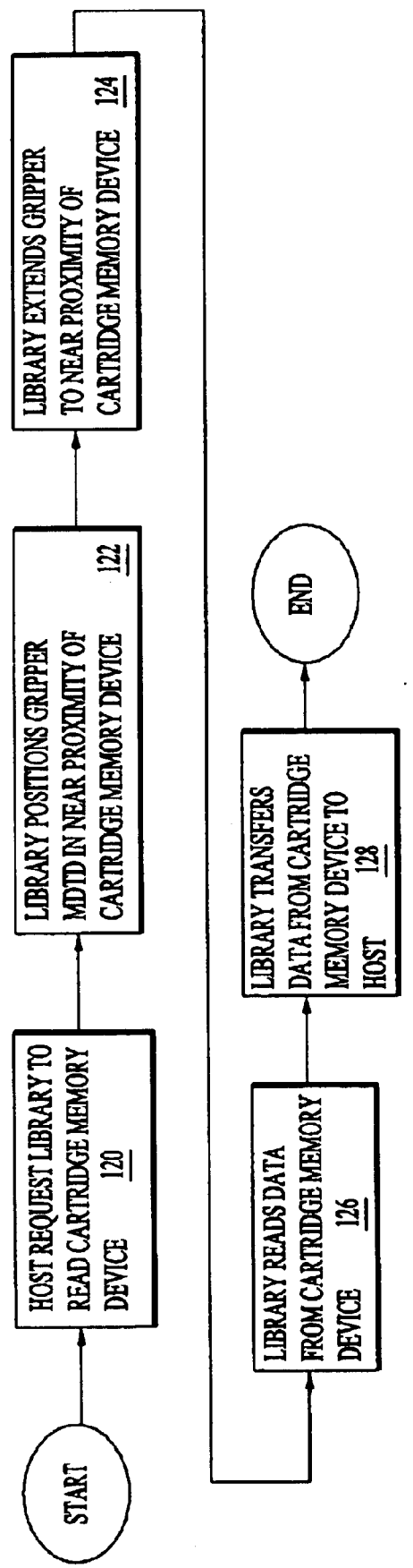
FIG. 7 shows an example flow diagram of the steps of transferring data to and from a cartridge in the system of FIG. 6.

Referring to FIG. 7, an example operation scenario includes the steps of: The host 40 sends a command to the library control 12 to transfer data to or from (e.g., read) from the MD 56 of a selected cartridge 21 (step 120). The library robot/picker/elevator as controlled by the picker electronics (including the robotic controller 96) positions the gripper 50 including the MDTD 80 in proximity of the MD 56 of the selected cartridge 21 (step 122). In a first example, the library control 12 positions the MDTD 80 in close proximity to the MD 56 of the cartridge 21, wherein the action of extending the gripper 50 is sufficient for reading data from the MD 56 (step 124). In a second example, the control 12 then extends the gripper 50 close to the cartridge 21 and reads data from the MD 56 of the cartridge 21 via the MDTD 80 in the gripper 50. In the first example, grabbing the cartridge 21 or picking the cartridge is not required for communication between the MDTD 80 and the MD 56. However, to ensure the optimum positioning of the MDTD 80 relative to MD 56, gripping the cartridge 21 is preferred. In either example, the MDTD 80 then reads data from the MD 56 (step 126). As before, the read data is transferred from the MD 56 through the MDTD 80, the gripper interconnect PWA 112, the extension axis interconnect PWA 90, the robotics backplane PWA 93, and the communication interface PWA 100 to the host system 40 (step 128).

Referring back to FIG. 6, an example operation for moving the platform 52 and reading data from the MD 56 of the selected cartridge 21 involves synchronized cooperation of the robotic controller 96, the actuator driver 98, a Y-Axis interconnect 24A on the Y-Axis platform 24, the extension axis interconnect 90 and the gripper interconnect 112, under supervision of the robotic controller 96 in the library control 12. The robotic controller 96 includes firmware with instructions to control the above operation. In one embodiment, the Y-axis Interconnect 24A provides a transition for power and control signals to and from the Y-Axis platform 24 of the robotic mechanism 34. Two umbilical cables from the robotics backplane 93 terminate on the controller 96 board. Further, cables from the extension interconnect 90 and the interconnect 112 of the gripper 50 also terminate on the controller 96 board. The signals from the extension interconnect 90 and the interconnect 112 are merged with the Y-Axis signals and fed down the two umbilical cables to the robotics backplane 93. The Y-Axis Interconnect 24A supports a Y-Axis home flag sensor and rotary axis home and limit flag sensors, as well as distributing motor control for the rotary.

The interconnect 112 provides a transition for power and control signals to and from the gripper of the robotic mechanism 34. The signals from the gripper 50 are fed out an umbilical cable to the Y-Axis interconnect 24A. The interconnect 112 supports gripper open/closed sensors, "Cartridge In Gripper" (CIG) sensors as well as distributing motor control for the gripper motor. Additional connectors support calibration scanner and barcode scanner devices mounted on the gripper 50. The gripper interconnect 112 also includes the connections and multiplexing logic for the MDTD 80.

Figure 8:
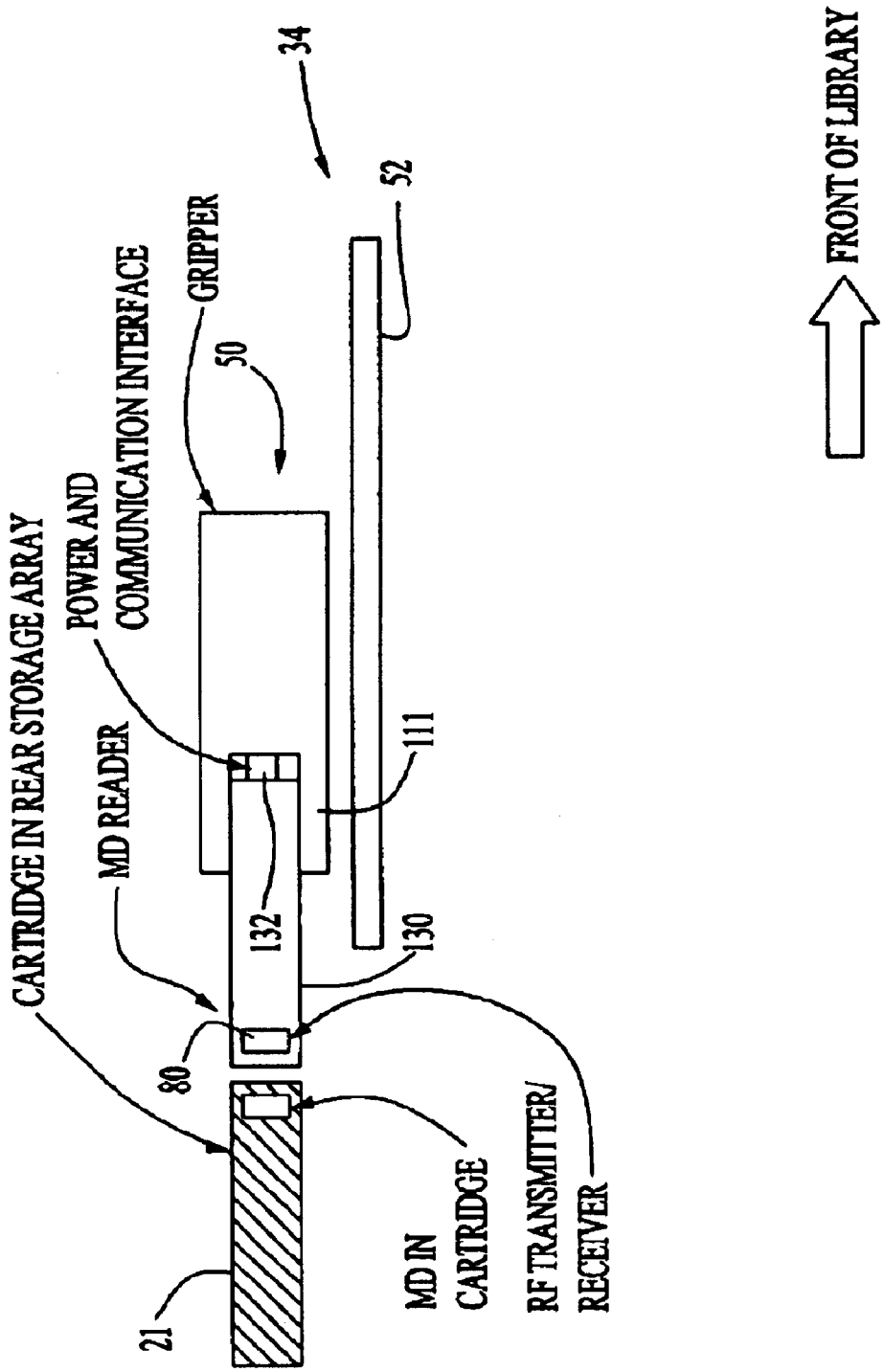
FIG. 8 shows an example simplified partial side view of another example picker mechanism used in the library of FIG. 1, wherein the memory data transfer device is in a separate housing shaped in the form of a cartridge as an MDTD tool.

Referring to FIG. 8, in another embodiment of the library 10, the MDTD 80 is placed in a housing shaped e.g. in the form of a tape cartridge 21, to form an MDTD tool 130 designed to be handled by the library's picker mechanism 34 to transfer data to and from the MD 56 of a cartridge 21. The MDTD tool 130 or the gripper 50 can include MDTD electronics interface 132 for interfacing the library 10 to the MD 56 in cartridges 21, wherein each MD 56 can be of a different type (e.g., LTO (Linear Tape Optional) and SDLT (Super DLT™) cartridge memory devices). In one example, the MDTD electronics interface 132 includes a connector or other such interface to pass power and signals between the library's robotic mechanism 34 (e.g., gripper 50) and the MDTD 80, transceiver electronics for processing the signals going to/from the MD 56 of a cartridge 21, and antennas 88 for MDTDs 80 (e.g., LTO, SDLT, etc.). When not in use, the MDTD tool 130 can be stored in a cartridge bin location 16 in the library 10. When required, the library picker mechanism 34 picks MDTD tool 130 in a manner similar to the way it picks a tape cartridge 21. When the MDTD tool 130 is fully seated in the gripper jaws 110, electrical connections are established between the library and MDTD tool 132 to transmit power and data from the library control 12 to the MDTD tool 130. The library control 12 then positions the MDTD tool 130 in front of a cartridge 21 in a bin 16, and transfers data to and from the cartridge MD 56 for transfer to the host 40. After using the MDTD tool 130, the library control 12 stows the MDTD tool 130 back in its bin location for later use.

Figure 9A:
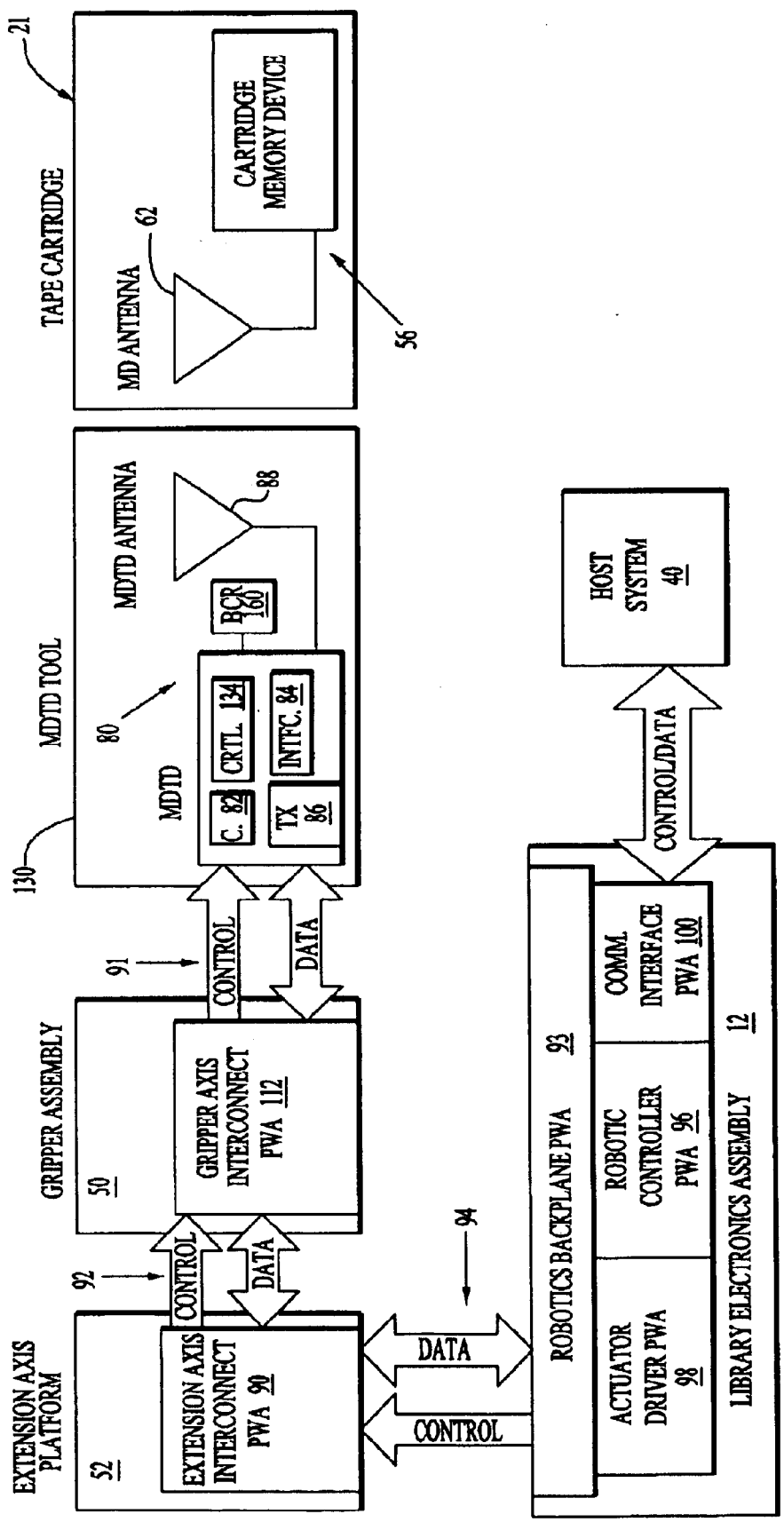
FIG. 9A shows an example block diagram of an embodiment of the system architecture of the library of FIG. 8.

As shown in FIG. 9A, the MDTD tool 130 further comprises the MDTD 80 and antenna 88 as described above. Further, the gripper axis interconnect PWA 112 includes cabling and electronics to power, and transfer data to and from, the MDTD 80 via the connector 82, and back to the extension axis interconnect PWA 90, and to the robotic controller electronics PWA 96 in a library electronics assembly 12 at e.g. the rear of the library 10 as described above. The MDTD 80 further comprises a controller 134 (e.g. a state-machine or micro-controller) for sequencing the operation of the MDTD 80 to transfer data to/from the MD 56 on command from the library control 12.

In one example, the connector 82 on the MDTD 80 mates with a connector (e.g., gripper axis interconnect 112) on the gripper 50. This interface supports power and control signals as well as data to and from the MDTD 80. The gripper 50 provides power, control and data to/from the MDTD 80. The MDTD 80 uses these signals to access the MD 56 in the tape cartridge 21, either reading or writing the data as required.

Figure 9B:
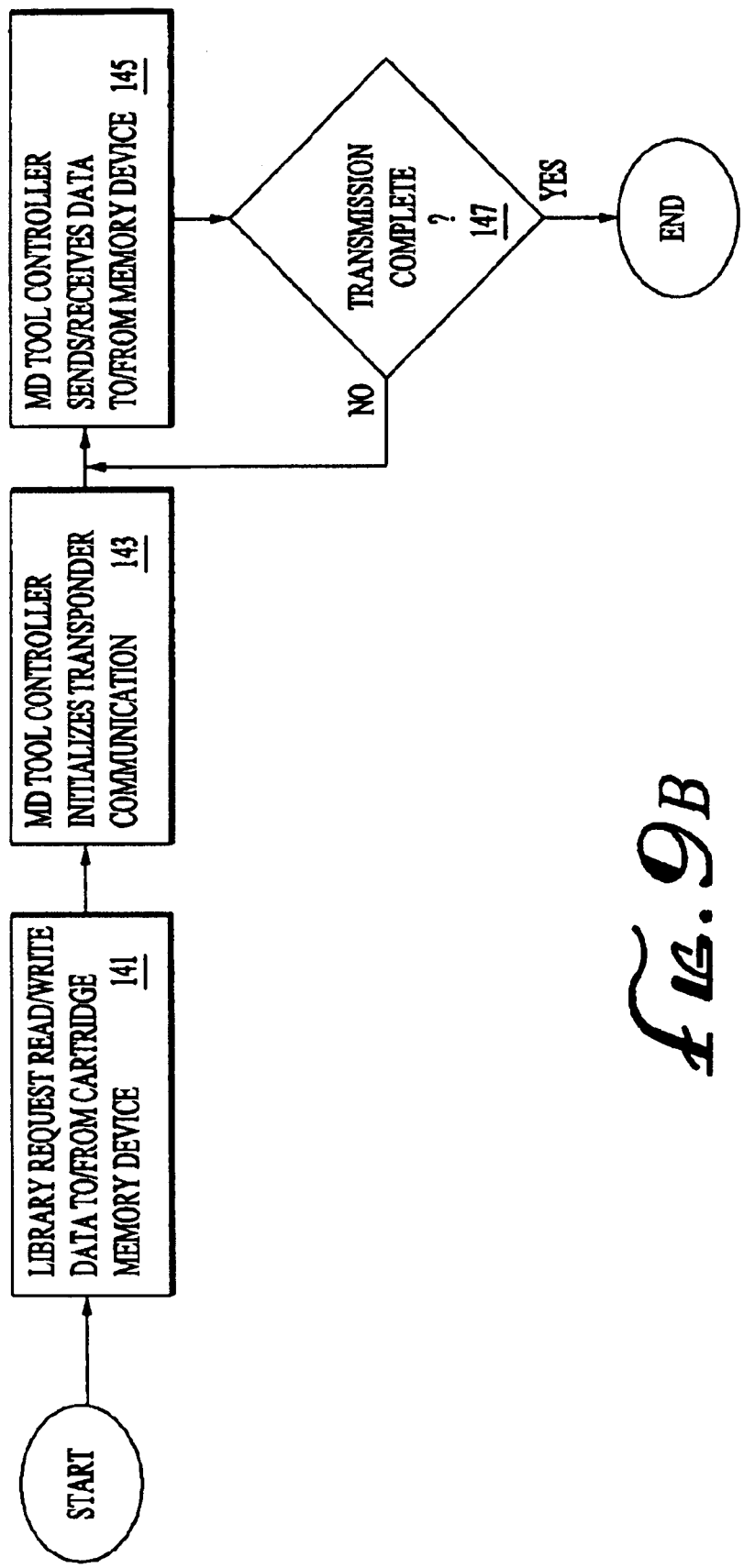
FIG. 9B shows a flow diagram of example steps performed by the MDTD in FIG. 9A.

FIG. 9B shows a flow diagram of example steps performed by the MDTD 80, wherein upon receiving a request to read/write data to/from a cartridge MD 56 (step 141), the controller 134 initializes communication with the MD 56 (step 143), and transfers data to/from the MD 56 (step 145) until completion of data transfer (step 147).

Figure 10:
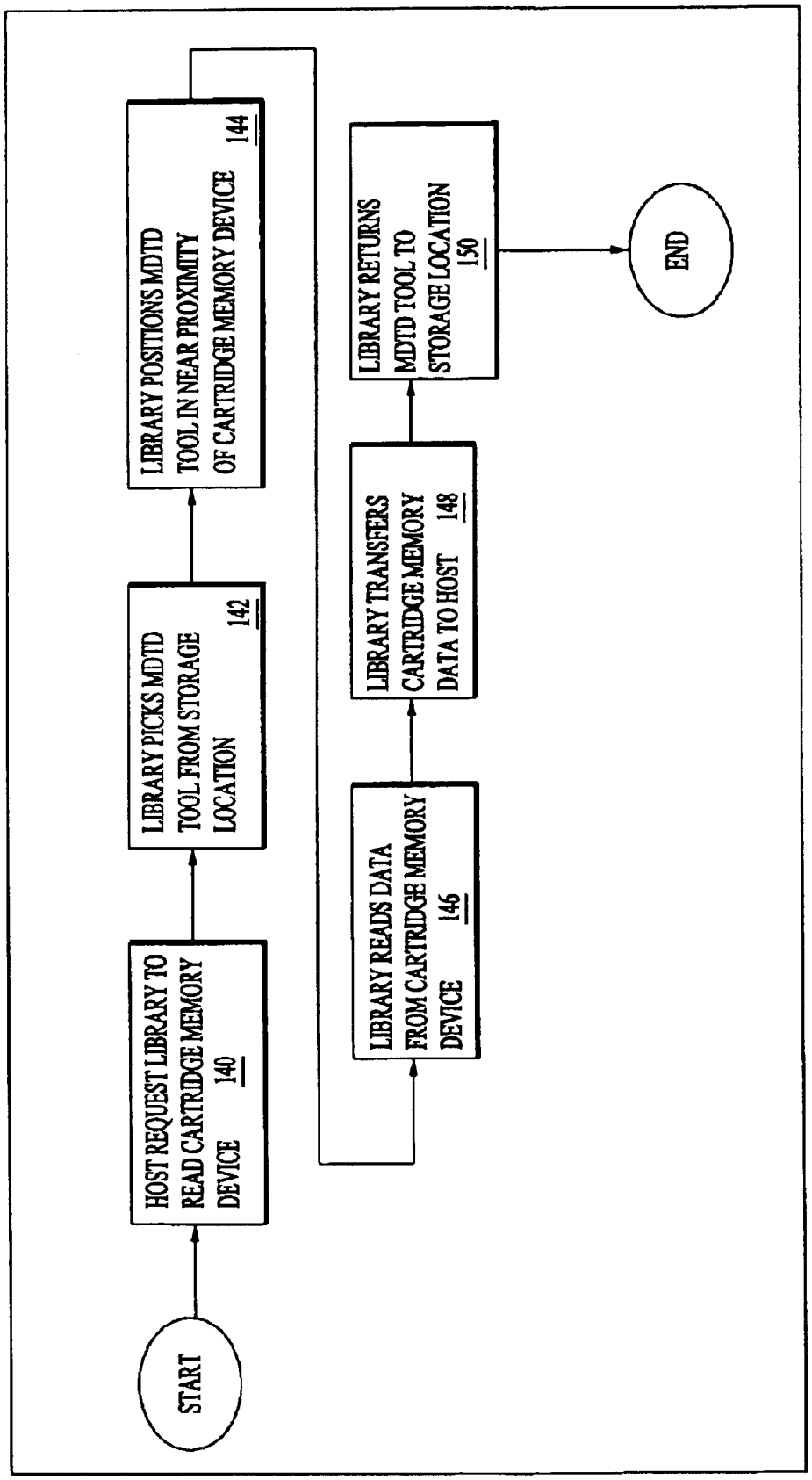
FIG. 10 shows an example flow diagram of the steps of transferring data to and from a cartridge in the system of FIG. 9A.

Referring to FIG. 10, an example operation scenario includes the steps of: the host 40 requests the library 12 to transfer data to or from (e.g., read) the MD 56 of a selected cartridge 21 (step 140). The library robot/picker/elevator as controlled by the picker electronics (including the controller 96) picks the MDTD tool 130 (containing the MDTD 80) from its storage location in the library 10 (step 142) and places the MDTD tool 130 in proximity of the MD 56 of the selected cartridge 21 (step 144). The library control 12 reads data from the MD 56 via the MDTD 80 in the MDTD tool 130 (step 146), and transfers data from the MD 56 to the host system 40 (step 148). Thereafter, the library can return the MDTD tool 130 to its storage location 16 (step 150).

In the above example embodiments, the connector/interface 132 of the MDTD tool 130, for providing communication and power lines to the MDTD 80, is located on the front side of the MDTD tool 130 (FIG. 8). The connector 132 can include a blind mate pin and socket, wiper contacts, spring-loaded contacts, or other contact means, for connecting with similar connection means in the gripper interconnect PWA 112. Further, the position of the antennas 88 for the MDTD 80 can be selected to be on the rear edge of the MDTD tool 130. The antennas 88 are positioned such that when the MDTD tool 130 is positioned in front of a cartridge 21 stored in a library bin location 16, the antennas 88 can be positioned in close proximity to the front of the cartridge 21 for communication with the MD 56 of the cartridge 21. As the gripper 50 handles the MDTD tool 130, if necessary, it is possible to move the MDTD tool 130 in direct contact with the tape cartridge 21.

Figure 11:
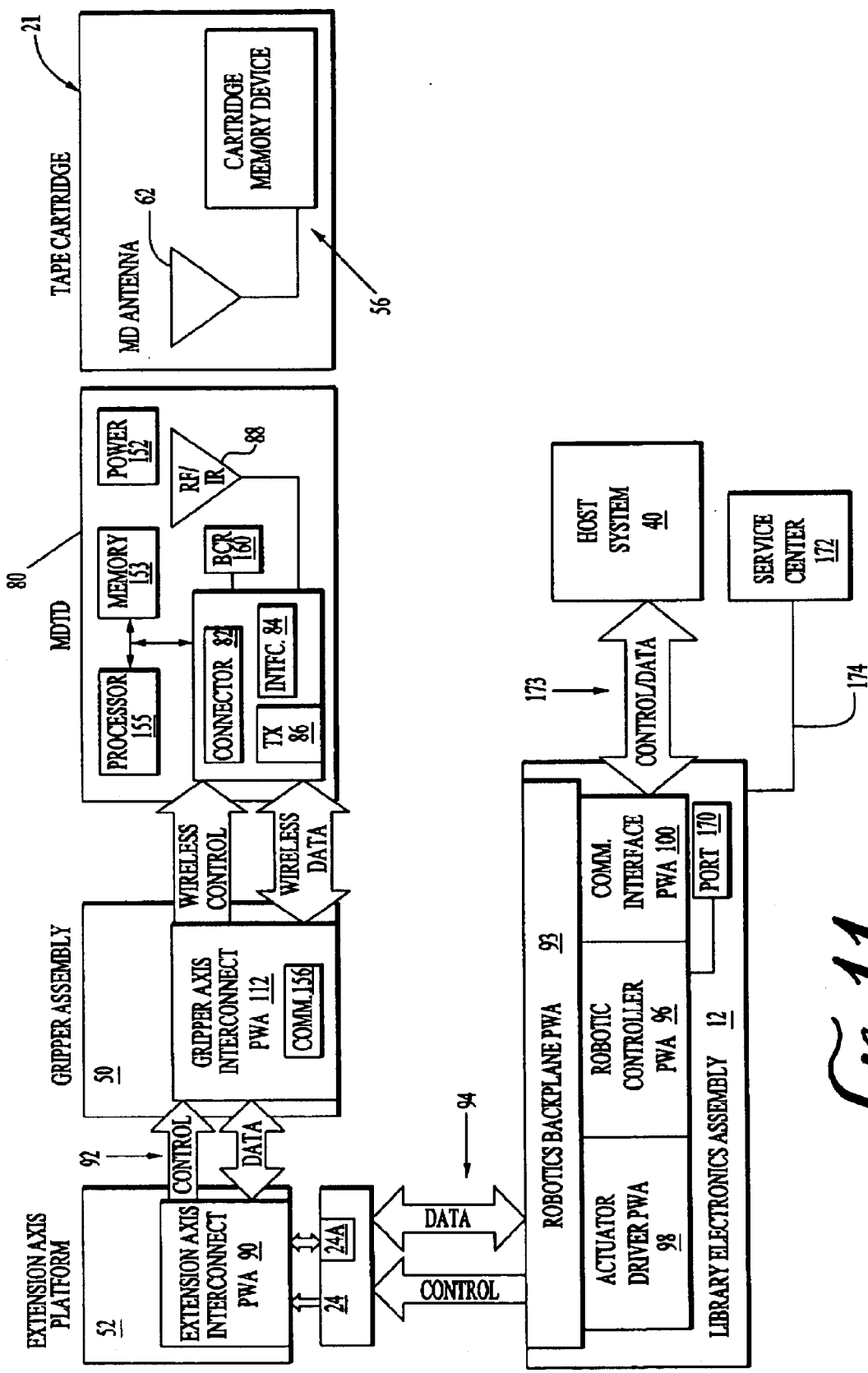
FIG. 11 shows an example block diagram of another embodiment of the system architecture of the library of FIG. 1.

Referring to FIG. 11, in another embodiment, the MDTD 80 can further include its own power source 152, such as a rechargeable battery, to eliminate any physical connection between the MDTD 80 and the picker 34 by using wireless communication between the MDTD 80 and the rest of the library 10 to transmit data and control information. The MDTD 80 and the gripper axis interconnect 112 include communication interfaces 86, 156, respectively, for wireless communication therebetween (e.g., radio frequency (RF), infra red (IR), etc.).

Figure 12:
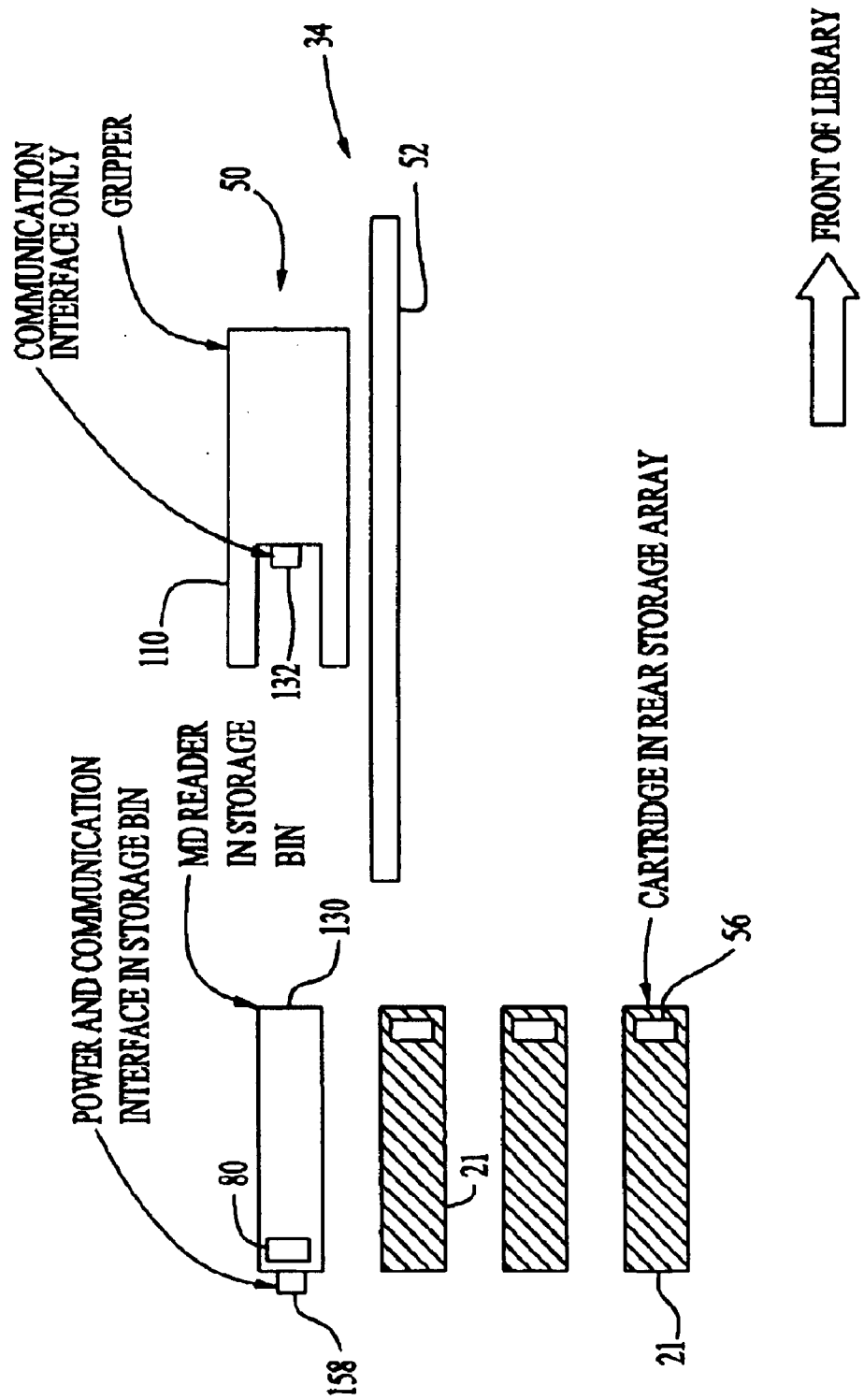
FIG. 12 shows an example simplified partial side view of another embodiment of the memory data transfer device of the library of FIG. 8 returned to its storage location to download data into the library electronics.

Further, to eliminate the need for real-time communication between the i MDTD 80 and the library electronics 12, a memory 153 (e.g., small solid state disk, RAM, ROM, NVRAM, etc.) for data storage can be included the MDTD 80. In this case, as the MDTD 80 e.g. reads data from a cartridge MD 56, such as during library initialization, the MDTD 80 can collect data from different cartridge MDs 56, and store the information in the MDTD memory 153 for later download to the library electronics 12. In versions where the MDTD 80 is in an MDTD tool 130, when the MDTD tool 130 is returned to its storage location, the MDTD 80 can then download all the data into the library electronics 12 and the battery 152 can be recharged as shown in FIG. 12. The library electronics assembly 12 includes connectors and interface electronics 158 for providing power, and wired or wireless data transfer to the MDTD 80 via the connector 82 and interface 84 in the MDTD 80.

The data stored in the MDTD memory 153 is marked to identify which set of data therein is associated with which cartridge 21 in the storage array of the library 10. This is analogous to using "file marks" in the data that is recorded using sequential access devices. In this case, the library 10 knows which cartridge 21 in a storage bin 16 the MDTD 80 is scanning, and therefore, the library 10 communicates the cartridge identification to the MDTD 80. For example, the MDTD 80 can utilize a look-up table including a plurality of entries corresponding to the cartridges 21 in the library 10, each entry inducing a cartridge identification and associated data. The MDTD 80 can further include a processor 155 (similar to controller 134 in FIG. 9A) to provide control and processing, including processing and managing the data in the MDTD memory 153. Program instructions for execution by the processor 155 can be stored in the MDTD memory 153. In another example, the processor 155 can comprise an ASIC configured to perform control and/or data processing onboard the MDTD 80.

Although in the above example scenarios the MDTD 80 transfers data from a cartridge MD 56 to the host 40 in a read operation, in other scenarios contemplated by the present invention data is transferred to the cartridge MD 56 for storage therein. Further the MDTD 80 can be utilized with mixed-media library including e.g. DLT, SDLT, LTO (DLT™—Digital Linear Tape, SDLT™—Super DLTT™, LTO—Linear Tape Optional) library design.

Referring to the example diagram in FIG. 13, in another aspect of the present invention, a barcode reader 160 is mounted on the picker assembly 34 (e.g., on the gripper 50 and/or the extension platform 52), and is used to read tape cartridge 21 bar code labels to identify individual tapes during inventory. In another embodiment, the barcode reader 160 can be placed in the MDTD 80 (e.g., FIG. 11) rather than the picker assembly 34, to free-up the mechanical envelope of the gripper to optimize the way library 10 utilizes the physical space within it. The MDTD 80 with bar code reader can then be either located on said extension platform 52 (e.g., FIG. 2A), on the gripper 50 (e.g., FIG. 5), or as a separate tool (e.g., MDTD tool 130, FIGS. 8–9) that the gripper 50 handles for reading barcode information from tape cartridges 21.

Yet in another embodiment, the library 10 can utilize different MDTD tools 130, each MDTD tool 130 configured as a specific purpose tool that interfaces with the power and data transmission infrastructure 112 built into the gripper 50. This is analogous to using multiple drill bits with the same drill chuck. An MDTD tool 130 for data transfer to cartridge MDs 56, and an MDTD tool 130 with bar code reader are two examples of such tools that use the same common infrastructure 132 within the library 10.

Referring to FIG. 14, in another version, an MDTD tool 130 is configured to communicate with one or more tape drives 18 (e.g., SDLT tape drive) in the library. Each tape drive 18 includes memory 162 therein for storing tape drive specific information, including tape drive diagnostic information. The tape drive 18 includes a diagnostic port 164 for interfacing and communicating diagnostic information to diagnostic tools such as an MDTD tool 130.

The MDTD tool 130 can include an RF transceiver, an IR transceiver or other wireless means 86 to communicate with a tape drive 18 equipped with matching communication means 166. In one example, the MDTD tool 130 includes an IR transceiver 86 for infrared communication with a tape drive 18 having an IR transceiver 166 e.g. at the front of the tape drive 18 to establish line of sight communication with the MDTD tool 130 placed in front of the tape drive 18 by the gripper 50. The MDTD tool 130 can interface with the tape drive diagnostic port 164 via the IR transceiver 166 of the tape driver 18, and communicate all the diagnostic information from the tape drive 18 back to the library electronics 12, and from there, to systems external to the library 10.

For example, the library 10 can communicate the tape drive diagnostic information to external systems in different ways, including for example: (1) through a SCSI interface in the library 10 to an ISV backup software package, (2) through a Simple Network Management Protocol (SNMP) capability in the library 10 to an enterprise network management system (SNMP is a industry standard protocol for transferring information over a network 173 (e.g., FIG. 11), and typically resides in a host computer 40 that monitors the operation of the tape library 10), (3) through a "phone home" capability to transfer information back and forth between a tape drive 18 (e.g., ATL) and a tape drive manufacturer's service site server (e.g., "Phone Home" refers to the feature of a library to connect to a service center 172 via a modem or network connection 174 (e.g., FIG. 11) and send diagnostic information indicating the health of the library 10 and/or the tape drives 18 within), (4) through a graphical user interface (GUI) control panel in the library 10 to an on-site field service engineer (e.g., the GUI is controlled by the library control 12, is displayed on e.g. a screen 22 in the front of the tape library 10, and provides means by with an operator can configure and status the state of the library), or (5) through a diagnostic port 170 in the library to a field service engineer's laptop computer, etc. (e.g., the diagnostic port 170 comprises a serial communications port on the robotics controller 96 (e.g., FIG. 11), and provides a communications interface for service personnel to use to configure and status the state of the library 10).

As such, information transferred into the library electronics 12 using an MDTD tool 30 (or MDTD 80), can be communicated to other systems through a variety of communication and connection means. Therefore, the library 10 comprises a centralized communication center for information therein including all the diagnostic information, not only for the automation subsystem (i.e., robotics controller, actuator driver, motor actuators and all the moving components of the robotic mechanism), but also for the tape drives 18 and cartridges 21 as well.

Because according to one embodiment of the present invention, the MDTD tool 130 is handled using the library's gripper mechanism 50, the MDTD tool 130 can be positioned as near to a cartridge 21 as is required to read the cartridge MD 56. Further, the same number of cartridges 21 can be maintained in the library 10 with or without the MDTD tool 130, with the exception of the cartridge bin occupied by the MDTD tool 130. When the MDTD 80 is positioned on the gripper 50, the time line to move from one cartridge to the next is improved. At the same time very little interior space is lost to support the MDTD 80. The MDTD antenna 88 can be mounted directly to the library's gripper mechanism 50, rather than integrates within/onto a separate removable cartridge-shaped tool 130. As such, the MDTD antenna 88 can be positioned nearer each cartridge MD antenna 62. For example, the MDTD antenna 88 can be mounted to the side or above the gripper jaws 110. Optionally, the MDTD antennas 88 can be mounted within the throat of the gripper jaws 110.

In another version, to transfer data to and from a cartridge MD 56, the cartridge 21 can be gripped and moved to a separate location (e.g., a dedicated bin 16 including MDTD 80 and interface 132, FIG. 13) to transfer data to and from the cartridge MD 56. As later tape drives 18 and media/cartridges 21 are introduced, using an MDTD tool 130 that can be exchanged or configured in the field, information can be transferred to and from the new cartridge MD 56 and tape drives 18. Further, using the MDTD tool 130 as a sensor tool, additional identification and diagnostic information can be introduced by subsystems within the library 10.

In the case of the MDTD tool 130 with barcode reader 160 (e.g., FIG. 9A), to change the barcode sensor wavelength for the bar code reader 160, a new bar code reader 160 can be incorporated within the MDTD tool 130, and MDTD tools 130 easily exchanged in the field. In general to transfer data to and from an MD 56, the MDTD antenna 88 distance to the MD antenna 62 can be about 10–12 mm, whereas to read a cartridge barcode the barcode reader 160 distance to the barcode can be about 4–6 inches.

Though in the description herein the library 10 comprises a tape library, the present invention is equally applicable to libraries storing other media (e.g., optical discs, etc.)

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A digital data storage unit, comprising:
   (a) a multiplicity of media storage slots for receiving a plurality of storage media units, each storage media unit including a storage medium and a memory device (MD) for storing data, the memory device including an interface for transferring data to and from the memory device;
   (b) one or more media data transfer devices physically distributed within the digital data storage unit in relation to the storage media slots for transferring data to and from the storage medium in each storage media unit;
   (c) a loader mechanism for selectively moving a storage media unit between a storage media slot and said media data transfer devices for transferring data to or from the storage medium in the storage media unit;
   (d) at least one memory data transfer device (MDTD) including a memory device interface for transferring data to and from the memory device of one or more storage media units, wherein the memory data transfer device is removeably stored in the digital data storage unit; and
   (e) a controller within the digital data storage unit, configured for: (i) controlling the loader mechanism to move storage media units to said one or more media transfer devices for transferring data to and from the storage medium in each storage media unit, and (ii) controlling the loader mechanism to move the memory data transfer device to a selected storage media unit for transferring data between the memory data transfer device and the memory device of the selected storage media unit.

2. The digital data storage unit of claim 1, wherein:
   the memory data transfer device further includes a controller interface for transferring data to and from the controller,
   the controller further includes an interface for transferring data to and from the memory data transfer device, and
   the controller is further configured for transferring data to and from the memory device of one or more storage media units via the memory data transfer device.

3. The digital data storage unit of claim 2, further comprising a communication link for connecting the controller to an external system, wherein the controller is further configured for transferring data between the memory device of one or more storage media units and the external system using the memory data transfer device.

4. The digital data storage unit of claim 1, further comprising a communication link connecting the controller to a host computer, wherein the controller is further configured for: (i) receiving and decoding a command sent by the host for access to a selected storage media unit to transfer data between the host computer and the memory device of the selected storage media, and (ii) transferring data between the host computer and the memory device of the selected storage media using the memory data transfer device.

5. The digital data storage unit of claim 1, wherein:
   the loader mechanism includes a gripper for gripping the memory data transfer device;
   the memory data transfer device is portable and is removably stored in the digital data storage unit; and
   the controller is further configured for controlling the loader mechanism for gripping and moving the memory data transfer device to a selected storage media unit for transferring data between the memory data transfer device and the memory device in the selected storage media unit.

6. The digital data storage unit of claim 5, further comprising a storage bin for removably storing the memory data transfer device.

7. The digital data storage unit of claim 6 further comprising an interface for transferring data between the memory data transfer device and the controller when the memory data transfer device is located in the storage bin.

8. The digital data storage unit of claim 1, wherein the memory data transfer device further includes memory storage for storing data transferred to or from the memory device of one or more storage media units.

9. The digital data storage unit of claim 8, wherein the controller is further configured for transferring data to and from said memory storage of the memory data transfer device.

10. The digital data storage unit of claim 1, wherein:
    the memory data transfer device is located in a storage location in the digital data storage unit; and
    the controller is configured for controlling the loader mechanism to move one or more storage media units to said storage location for transferring data between the memory data transfer device and the memory device of each storage media unit.

11. The digital data storage unit of claim 1, wherein:
    each storage media unit comprises a tape cartridge, and the storage media in the tape cartridge comprises magnetic tape; and
    each media data transfer device comprises a tape drive.

12. The digital data storage unit of claim 1, wherein:
    the memory data transfer device includes a first wireless communication interface; and
    the memory device in each storage media unit includes a second wireless communication interface for wireless communication with the memory data transfer device.

13. The digital data storage unit of claim 12, wherein the memory data transfer device further includes:
    a memory for storing information including information obtained from the memory device of one or more media storage units;
    a third communication interface for transferring data to and from said controller; and a microcontroller configured for controlling the first communication interface to transfer data to and from the memory device of one more storage media units, and for controlling the third communication interface to transfer data to and from said controller.

14. The digital data storage unit of claim 1, wherein the memory device in each media storage unit includes information about the media storage unit.

15. A method for operating a digital data storage unit including a multiplicity of media storage slots for receiving a plurality of storage media units, one or more media data transfer devices physically distributed within the digital data storage unit in relation to the storage media slots for transferring data to and from the storage medium in each storage media unit, a loader mechanism for selectively moving a storage media unit between a storage media slot and said media data transfer devices for writing data to or reading data from the storage medium in the storage media unit, and a storage unit controller connected to a host computer, the method comprising the steps of:

(a) maintaining a plurality of storage media units in said slots, each storage media unit including a storage medium and a memory device (MD) for storing data, the memory device including an interface for transferring data to and from the memory device, (b) maintaining at least one memory data transfer device (MDTD) in the digital data storage unit, the memory data transfer device including a memory device interface for transferring data to and from the memory device of one or more storage media units, and (c) controlling the loader mechanism to move the memory data transfer device to a selected storage media unit for transferring data between the memory data transfer device and the memory device of one or more selected storage media units.

16. The method of claim 15, wherein:

the memory data transfer device further includes a controller interface for transferring data to and from the storage unit controller, the controller further includes an interface for transferring data to and from the memory data transfer device, and the method further comprising the steps of transferring data between the memory data transfer device and the storage unit controller.

17. The method of claim 15, wherein:

the memory data transfer device further includes communication means for transferring data to and from the storage unit controller;

the method further comprising the steps of:

decoding a command sent by the host computer to the storage unit controller for access to a selected storage media unit for transferring data between the host computer and the memory device of the selected storage media unit; and transferring data between the host computer and the memory device of the selected storage media unit via the memory data transfer device and the storage unit controller.

18. The method of claim 15, wherein:

the memory data transfer device is removably maintained in the digital data storage unit;

the loader mechanism includes a gripper for gripping the memory data transfer device; and step (c) further includes the steps of controlling the loader mechanism for gripping and moving the memory data transfer device to a selected storage media unit for transferring data between the memory data transfer device and the memory device in the selected storage media unit.

19. The method of claim 15, wherein the digital data storage unit further includes a storage bin for removably storing the memory data transfer device.

20. The method of claim 19, wherein the digital data storage unit further includes an interface for transferring data between the memory data transfer device and the storage unit controller when the memory data transfer device is located in the storage bin, and further comprising the steps of transferring data between the storage unit controller and the memory data transfer device located in the storage bin.

21. The method of claim 15, wherein the memory data transfer device further includes memory storage for storing data transferred to or from the memory device of one or more storage media units, and further comprising the steps of transferring data to and from said memory storage of the memory data transfer device.

22. The method of claim 21 further comprising the steps of:

transferring data between the memory storage of the memory data transfer device and the memory device of one or more storage media units; and transferring data between the storage unit controller and memory storage of the memory data transfer device.

23. The method of claim 15, wherein the memory data transfer device is located in a storage location in the digital data storage unit, and further comprising the steps of controlling the loader mechanism to move one or more storage media units to said storage location for transferring data between the memory data transfer device and the memory device of the one or more storage media units.

24. The method of claim 15, wherein:

each storage media unit comprises a tape cartridge, and the storage media in the tape cartridge comprises magnetic tape; and each media data transfer device comprises a tape drive.

25. The method of claim 15, wherein:

the memory data transfer device includes a first wireless communication interface;

the memory device in each storage media unit includes a second wireless communication interface for wireless communication with the memory data transfer device;

step (c) further includes the steps of transferring data between the memory data transfer device and the memory device of one or more selected storage media units by wireless communication.

26. The method of claim 15, further comprising the steps of:

for each storage media unit, transferring data including information about that storage media unit to/from the memory device of the storage media unit.

27. A digital data storage unit comprising:

(a) a multiplicity of media storage slots for receiving a plurality of storage media units, each storage media unit including a storage medium;

(b) one or more media data transfer devices physically distributed within the digital data storage unit in relation to the storage media slots for transferring data to and from the storage medium in each storage media unit, each of one or more of the media data transfer devices including a memory device for storing data and an interface for transferring data to and from said memory device;

(c) a loader mechanism for selectively moving a storage media unit between a storage media slot and said media data transfer devices for transferring to or from the storage medium in the storage media unit;

(d) at least one memory data transfer device (MDTD) including a memory device interface for transferring data to and from the memory device of one or more media data transfer devices; and (e) a controller within the data storage unit, configured for controlling the loader mechanism to move storage media units to said one or more media transfer devices for transferring data to and from the storage medium in each storage media unit.

28. The digital data storage unit of claim 27, wherein:

the memory data transfer device further includes a controller interface for transferring data to and from the controller, the controller further includes an interface for transferring data to and from the memory data transfer device, and the controller is further configured for transferring data to and from the memory device of one or more media data transfer devices via the memory data transfer device.

29. The digital data storage unit of claim 28, further comprising a communication link for connecting the controller to an external system, wherein the controller is further configured for transferring data between the memory device of one or more media data transfer devices and the external system using the memory data transfer device.

30. The digital data storage unit of claim 27, wherein:

the memory data transfer device is supported by the loader mechanism, and the controller is further configured for controlling the loader mechanism for moving the memory data transfer device to a selected media data transfer device for transferring data between the memory data transfer device and the memory device in the media data transfer device.

31. The digital data storage unit of claim 27, wherein:

the loader mechanism includes a gripper for gripping the memory data transfer device;

the memory data transfer device is removably stored in the digital data storage unit; and the controller is further configured for controlling the loader mechanism for gripping and moving the memory data transfer device to a selected media data transfer device for transferring data between the memory data transfer device and the memory device in the selected media data transfer device.

32. The digital data storage unit of claim 31, further comprising a storage bin for removably storing the memory data transfer device.

33. The digital data storage unit of claim 32, further comprising an interface for transferring data between the memory data transfer device and the controller when the memory data transfer device is located in the storage bin.

34. The digital data storage unit of claim 27, wherein the memory data transfer device further includes memory storage for storing data transferred to or from the memory device of one or more media data transfer devices.

35. The digital data storage unit of claim 34, wherein the controller is further configured for transferring data to and from said memory storage of the memory data transfer device.

36. The digital data storage unit of claim 27, wherein:

each storage media unit comprises a tape cartridge, and the storage media in the tape cartridge comprises magnetic tape; and each media data transfer device comprises a tape drive.

37. The digital data storage unit of claim 27, wherein the memory data transfer device includes a first wireless communication interface; and the memory device in each media data transfer device includes a second wireless communication interface for wireless communication with the memory data transfer device.

38. The digital data storage unit of claim 37, wherein the memory data transfer device further includes:

a memory for storing information including information obtained from the memory device of one or more media storage units;

a third communication interface for transferring data to and from said controller; and a microcontroller configured for controlling the first communication interface to transfer data to and from the memory device of one more media data transfer devices, and for controlling the third communication interface to transfer data to and from said controller.

39. The digital data storage unit of claim 27, wherein the memory device in each media storage unit includes information about the media data transfer device.

* * * * *